(12) United States Patent
Ishida

(10) Patent No.: US 11,999,863 B2
(45) Date of Patent: *Jun. 4, 2024

(54) WHITE INK COMPOSITION AND RECORDING METHOD

(71) Applicant: Seiko Epson Corporation, Tokyo (JP)

(72) Inventor: Kohei Ishida, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 86 days.

This patent is subject to a terminal disclaimer.

(21) Appl. No.: 17/534,525

(22) Filed: Nov. 24, 2021

(65) Prior Publication Data

US 2022/0169873 A1 Jun. 2, 2022

(30) Foreign Application Priority Data

Nov. 27, 2020 (JP) .................. 2020-197290

(51) Int. Cl.
*C09D 11/107* (2014.01)
*B41J 2/21* (2006.01)
(Continued)

(52) U.S. Cl.
CPC ........... *C09D 11/107* (2013.01); *B41J 2/2107* (2013.01); *B41J 2/2114* (2013.01); *B41J 2/2117* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161;
(Continued)

(56) References Cited

U.S. PATENT DOCUMENTS

2011/0184108 A1* 7/2011 Okuda .................. C09D 11/322
524/507
2011/0242200 A1* 10/2011 Tojo ....................... B41M 7/009
347/21

(Continued)

FOREIGN PATENT DOCUMENTS

CN 103802518 A 5/2014
JP 2015-147405 A 8/2015
(Continued)

*Primary Examiner* — Manish S Shah
(74) *Attorney, Agent, or Firm* — Harness, Dickey & Pierce, P.L.C.

(57) ABSTRACT

A white ink composition which is an aqueous ink jet ink, includes a white colorant and a fixing resin, and the fixing resin contains an acrylic-based resin having an acid value of 50.0 to 100.0 mgKOH/g and a glass transition temperature of 20.0° C. to 50.0° C.

11 Claims, 1 Drawing Sheet

(51) Int. Cl.
*B41M 5/00* (2006.01)
*C09D 11/322* (2014.01)
*C09D 11/38* (2014.01)

(52) U.S. Cl.
CPC ......... *B41M 5/0023* (2013.01); *C09D 11/322* (2013.01); *C09D 11/38* (2013.01)

(58) Field of Classification Search
CPC ... B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2013/0225748 A1* | 8/2013 | Jakubek | C09D 11/322 524/556 |
| 2014/0132684 A1* | 5/2014 | Ohta | B41J 11/0015 347/102 |
| 2015/0197654 A1 | 7/2015 | Okuda et al. | |
| 2015/0375528 A1 | 12/2015 | Kitagawa et al. | |
| 2016/0068697 A1* | 3/2016 | Toda | B41J 2/2107 347/100 |
| 2016/0311233 A1* | 10/2016 | Murai | B41J 2/2107 |
| 2017/0165979 A1* | 6/2017 | Ohta | B41M 7/009 |
| 2018/0258298 A1 | 9/2018 | Shiiba et al. | |
| 2018/0282567 A1* | 10/2018 | Ishida | D06P 1/54 |
| 2018/0291217 A1* | 10/2018 | Kagata | B41J 2/2107 |
| 2019/0284411 A1 | 9/2019 | Okuda et al. | |
| 2019/0352524 A1* | 11/2019 | Yatake | B41M 5/0023 |
| 2021/0024767 A1 | 1/2021 | Asakawa et al. | |
| 2021/0129569 A1 | 5/2021 | Fujita et al. | |
| 2021/0198503 A1* | 7/2021 | Yatake | C08G 18/222 |
| 2021/0371687 A1* | 12/2021 | Ishida | B41J 2/2107 |
| 2023/0023979 A1* | 1/2023 | Asakawa | B41M 5/0011 |

FOREIGN PATENT DOCUMENTS

| | | |
|---|---|---|
| JP | 2015-183112 A | 10/2015 |
| JP | 2018-104561 A | 7/2018 |

* cited by examiner

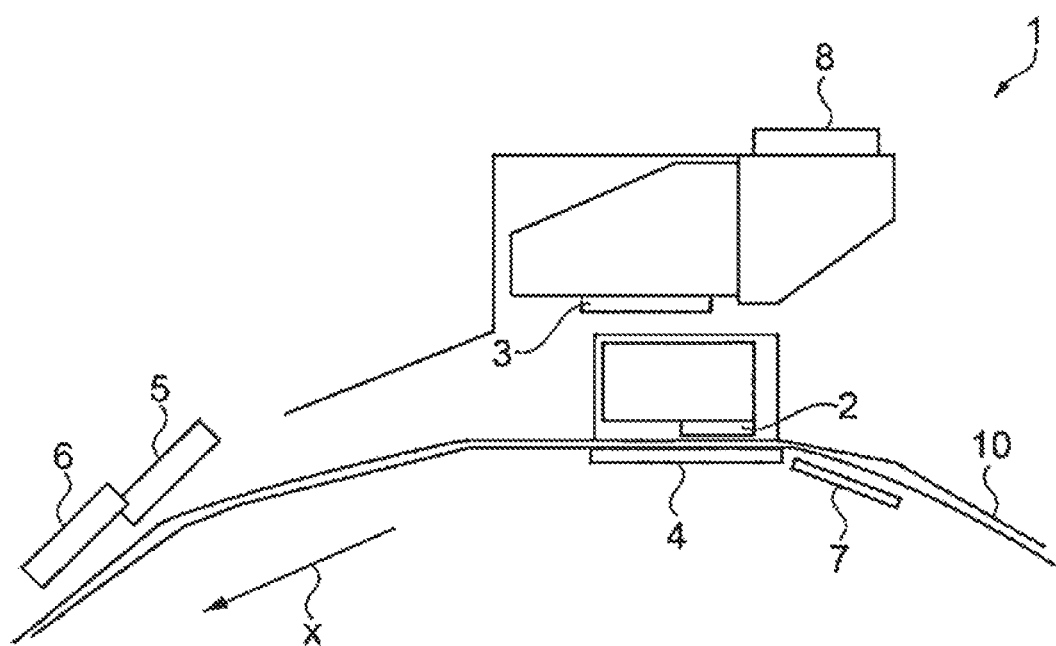

WHITE INK COMPOSITION AND RECORDING METHOD

The present application is based on, and claims priority from JP Application Serial Number 2020-197290, filed Nov. 27, 2020, the disclosure of which is hereby incorporated by reference herein in its entirety.

BACKGROUND

1. Technical Field

The present disclosure relates to a white ink composition and a recording method.

2. Related Art

An ink jet recording method for recording an image on a recording medium by ejecting fine ink droplets from a recording head of an ink jet recording apparatus has been known. Development of techniques relating to ink jet recording has been aggressively performed, and the use of the ink jet recording method has been investigated in a wide range of fields.

For example, JP-A-2015-183112 has disclosed an ink set in which even when an ink low-absorbing or non-absorbing recording medium is used, an image excellent in abrasion resistance and fixing property to the recording medium can be recorded. The patent document described above has also disclosed that by an ink set which includes two types of clear inks containing resins having different glass transition temperatures and at least one ink containing a colorant, an image excellent not only in abrasion resistance and adhesion but also in solvent resistance can be recorded.

A recorded matter is required to have a wide range of performances in accordance with various applications, and for example, in a printing field in which recording is performed on a film, a printed matter may be used in some cases after being laminated. When a white ink composition is used, a laminate strength is required. In addition, after printing is performed, a recording medium may be wound in a roll shape in some cases, and in particular, when a white ink composition is used, bleed-through, so-called blocking, may occur in some cases.

In the ink set disclosed in JP-A-2015-183112, although an image excellent in abrasion resistance, adhesion, and solvent resistance can be expected, as for a laminate strength and an anti-blocking property obtained when a colorant is white, a sufficient image may not be always formed.

SUMMARY

According to an aspect of the present disclosure, there is provided a white ink composition which is an aqueous ink jet ink, comprising: a white colorant and a fixing resin, and the fixing resin contains an acrylic-based resin having an acid value of 50.0 to 100.0 mgKOH/g and a glass transition temperature of 20.0° C. to 50.0° C.

According to another aspect of the present disclosure, there is provided a recording method comprising a step of adhering the white ink composition described above to a recording medium by an ink jet method.

BRIEF DESCRIPTION OF THE DRAWINGS

FIGURE is a schematic cross-sectional view showing the structure of an ink jet recording apparatus.

DESCRIPTION OF EXEMPLARY EMBODIMENTS

Hereinafter, embodiments of the present disclosure will be described. The following embodiments are described to explain examples of the present disclosure. The present disclosure is not limited to the following embodiments and includes variously modified embodiments to be performed without departing from the scope of the present disclosure. In addition, all the components described below are not always required to be essential components of the present disclosure.

1. WHITE INK COMPOSITION

A white ink composition according to this embodiment is a white ink composition which is an aqueous ink jet ink and includes a white colorant and a fixing resin.

1.1. White Colorant

As a white colorant included in the white ink composition, for example, a metal compound, such as a metal oxide, barium sulfate, or calcium carbonate, may be mentioned. In typical, an inorganic metal compound may be mentioned. As the metal oxide, for example, a white pigment, such as titanium dioxide, zinc oxide, silica, alumina, or magnesium oxide, may be mentioned. In addition, as the white pigment, particles each having a hollow structure may also be used, and as the particles each having a hollow structure, known particles may be used.

As the white pigment, among those mentioned above by way of example, since the degree of whiteness and the abrasion resistance are excellent, titanium dioxide is preferably used. The white pigment may be used alone, or at least two types thereof may be used in combination.

A volume-basis average particle diameter (D50) (also called "volume average particle diameter") of the white pigment is preferably 30.0 to 600.0 nm, more preferably 100.0 to 500.0 nm, and further preferably 150.0 to 400.0 nm. When the volume average particle diameter of the white pigment is in the range described above, since the particles are not likely to precipitate, a dispersion stability can be improved, and in addition, for example, clogging of a nozzle can be suppressed from being generated when the white pigment is used for an ink jet recording apparatus. In addition, when the volume average particle diameter of the white pigment is in the range described above, the degree of whiteness and a background shielding property of an image cans be sufficiently obtained.

The volume average particle diameter of the white pigment may be measured by a particle size distribution measurement device using a laser diffraction scattering method as a measurement principle. As the particle size distribution measurement device, for example, a particle size distribution meter (such as "Microtrack UPA", manufactured by Nikkiso Co., Ltd.) using a dynamic light scattering method as a measurement principle may be mentioned.

In addition, in this specification, the term "white" used to express a white ink composition, a white colorant, or the like not only indicates "perfect white" but also includes a chromatic and achromatic color and a glossy color as long as the color may be viewed in a range of white. In addition, when an ink and a pigment are named and/or sold by the names which suggest a white ink and a white pigment, respectively, those products are each regarded to have a white color.

In order to more quantitatively represent "white color", for example, in CIELAB, a recorded matter not only has a color having an L* value of 100 but also includes a color having an L* value of 60 to 100 and a* and b* values each in the range of ±10.

In more particular, for example, when a recording medium surface of a recording medium, such as a transparent film, is recorded with a sufficient covering amount of a white ink composition, and the brightness (L*) and the chromaticity (a*, b*) of a recorded portion of a recorded matter are measured by a spectrophotometer in accordance with CIELAB, the white ink composition is preferably in the range described above. The recorded matter in which the recording is performed with the sufficient covering amount has, for example, an adhesion amount of 15 mg/inch². In addition, $80 \leq L^* \leq 100$, $-4.5 \leq a^* \leq 2.0$, and $-10.0 \leq b^* \times 2.5$ are more preferably satisfied. As the transparent film-made recording medium, for example, LAG Jet E-1000ZC (manufactured by LINTEC Corporation) may be mentioned. As the spectrophotometer in accordance with CIELAB, for example, Spectrolino (trade name, manufactured by Gretag-Macbeth) may be mentioned, and the measurement is performed in conditions of a light source of D50, a field of view of 2°, a concentration of DIN NB, a white standard of Abs, a filter of No, and a measurement mode of Reflectance.

A content (solid content) of the white pigment in the white ink composition with respect to the total mass of the white ink composition is preferably 0.5 to 20.0 percent by mass, more preferably 1.0 to 20.0 percent by mass, even more preferably 5.0 to 15.0 percent by mass, and further preferably 7.0 to 15.0 percent by mass. When the content of the white pigment is in the range described above, for example, nozzle clogging of an ink jet recording apparatus is not likely to occur, and the white color density can be sufficiently satisfied.

It is preferable to stably disperse the white pigment in water, and hence, a dispersant may be used for dispersion. As the dispersant, for example, either a surfactant or a resin dispersant may be used, and among materials which enable the white pigment to have a preferable dispersion stability in the white ink composition, at least one may be selected. In addition, the white pigment may be used as a self-dispersible pigment by surface modification of pigment particles, such as by oxidizing or sulfonating the pigment surface with ozone, hypochlorous acid, fuming sulfuric acid, or the like.

The dispersant functions to disperse the pigment. Hence, in the ink, the dispersant is present in the vicinity of the surface of the pigment and, for example, may be adhered to the surface of the pigment in some cases. The resin dispersant is to be regarded as a material different from the fixing resin which will be described below.

As the resin dispersant, for example, there may be mentioned a water soluble resin including: a (meth)acrylic-based resin or its salt, such as a poly(meth)acrylic acid, a (meth)acrylic acid-acrylonitrile copolymer, a (meth)acrylic acid-(meth)acrylate ester copolymer, a vinyl acetate-(meth)acrylate ester copolymer, a vinyl acetate-(meth)acrylic acid copolymer, or a vinyl naphthalene-(meth)acrylic acid copolymer; a styrene-based resin or its salt, such as a styrene-(meth)acrylic acid copolymer, a styrene-(meth)acrylic acid-(meth)acrylate ester copolymer, a styrene-α-methylstyrene-(meth)acrylic acid copolymer, a styrene-α-methylstyrene-(meth)acrylic acid-(meth)acrylate ester copolymer, a styrene-maleic acid copolymer, or a styrene-maleic anhydride copolymer; an urethane-based resin or its salt which is a high molecular weight material compound (resin) including urethane bonds each formed by a reaction between an isocyanate group and a hydroxy group, which may have a linear and/or a branched structure, and which may be either cross-linked or not; a poly(vinyl alcohol); a vinyl naphthalene-maleic acid copolymer or its salt; a vinyl acetate-maleate ester copolymer or its salt; or a vinyl acetate-crotonic acid copolymer or its salt. Among those mentioned above, a copolymer formed from a monomer having a hydrophobic functional group and a monomer having a hydrophilic functional group or a polymer formed from a monomer having both a hydrophobic functional group and a hydrophilic functional group is preferable. As the form of the copolymer, any one of a random copolymer, a block copolymer, an alternating copolymer, and a graft copolymer may be used.

As a commercially available product of the styrene-based resin dispersant, for example, there may be mentioned X-200, X-1, X-205, X-220, or X-228 (manufactured by Seiko PMC Corporation); Nopcosperse (registered trademark) 6100 or 6110 (manufactured by San Nopco Limited); Joncryl 67, 586, 611, 678, 680, 682, or 819 (manufactured by BASF); DISPERBYK-190 (manufactured by BYK Japan KK); or N-EA137, N-EA157, N-EA167, N-EA177, N-EA197D, N-EA207D, or E-EN10 (manufactured by DKS Co., Ltd.).

In addition, as a commercially available acrylic-based resin dispersant, for example, there may be mentioned BYK-187, BYK-190, BYK-191, BYK-194N, or BYK-199 (manufactured by BYK Japan KK); Aron A-210, A6114, AS-1100, As-1800, A-30SL, A-7250, or CL-2 (manufactured by Toagosei Company, Limited).

Furthermore, as a commercially available urethane-based resin dispersant, for example, there may be mentioned BYK-182, BYK-183, BYK-184, or BYK-185 (manufactured by BYK Japan KK); TEGO Disperse 710 (manufactured by Evonic Tego Chemi); or Borchi (registered trademark) Gen 1350 (manufactured by OMG Borschers).

The dispersant may be used alone, or at least two types thereof may be used in combination. A total content of the dispersant with respect to 50 parts by mass of the white pigment is preferably 0.1 to 30 parts by mass, more preferably 0.5 to 25 parts by mass, even more preferably 1 to 20 parts by mass, and further preferably 1.5 to 15 parts by mass. Since the content of the dispersant with respect to 50 parts by mass of the white pigment is 0.1 parts by mass or more, the dispersion stability of the white pigment can be further improved. In addition, when the content of the dispersant with respect to 50 parts by mass of the white pigment is 30 parts by mass or less, the viscosity of a dispersion to be obtained can be decreased low.

Among the dispersants thus described by way of example, the resin dispersant is preferable, and in particular, at least one selected from the acrylic-based resin dispersant, the styrene-based resin dispersant, and the urethane-based resin dispersant is more preferable. In addition, in the case described above, a weight average molecular weight of the dispersant is more preferably 500 or more. When the resin dispersant as described above is used as the dispersant, while odor is suppressed, the dispersion stability of the white pigment can be further improved.

In addition, when the resin dispersant is used, although a content of the resin dispersant may be appropriately selected in accordance with the type of white pigment, the content of the resin dispersant with respect to 100 parts by mass of the white pigment in the white ink composition is preferably 5 to 200 parts by mass and more preferably 20 to 120 parts by mass.

1.2. Fixing Resin

The white ink composition of this embodiment includes a fixing resin. The fixing resin is a resin to fix ink components, such as the pigment, of the ink to a recording medium and is uniformly dispersed or dissolved in a solvent component of the ink.

The fixing resin contains an acrylic-based resin having an acid value of 50.0 to 100.0 mgKOH/g and a glass transition temperature (Tg) of 20.0° C. to 50.0° C. Hereinafter, the acrylic-based resin (hereinafter, also referred to as "specific acrylic-based resin" in some cases) having an acid value of 50.0 to 100.0 mgKOH/g and a glass transition temperature (Tg) of 20.0° C. to 50.0° C. will be described.

1.2.1. Specific Acrylic-Based Resin

The specific acrylic-based resin of this specification indicates, among acrylic-based resins, an acrylic-based resin having an acid value of 50.0 to 100.0 mgKOH/g and a glass transition temperature (Tg) of 20.0° C. to 50.0° C.

The acrylic-based resin is a generic name of a polymer obtained by polymerization using at least one acrylic-based monomer, such as a (meth)acrylic acid or a (meth)acrylate ester, as one component, and for example, a resin obtained from an acrylic-based monomer or a copolymer obtained from an acrylic-based monomer and a monomer different therefrom may be mentioned. As the acrylic-based resin, for example, a (meth)acryl-vinyl-based resin which is a copolymer of an acrylic-based monomer and a vinyl-based monomer, such as styrene, may be mentioned. In addition, (meth)acrylamide and (meth)acrylonitrile are each also an acrylic-based monomer, and a polymer using the monomer mentioned above is also regarded as the acrylic-based resin.

In addition, in this specification, the (meth)acryl indicates at least one of acryl and methacryl.

A styrene-acrylic-based resin is a copolymer obtained from a styrene monomer and an acrylic-based monomer, and for example, a styrene-acrylic acid copolymer, a styrene-methacrylic acid copolymer, a styrene-methacrylic acid-acrylate ester copolymer, a styrene-α-methylstyrene-acrylic acid copolymer, or a styrene-α-methylstyrene-acrylic acid-acrylate ester copolymer may be mentioned.

Among the above acrylic-based resins, the specific acrylic-based resin is selected from those each having an acid value of 50.0 to 100.0 mgKOH/g.

The acid value of the specific acrylic-based resin is more preferably 55.0 to 90.0 mgKOH/g and even more preferably 60.0 to 85.0 mgKOH/g. When the acid value of the specific acrylic-based resin is in the range described above, a laminate strength of the recorded matter can be further improved.

When the acid value is higher than or equal to the lower limit of the above range, the laminate strength is estimated to be improved by acid groups of the resin. In addition, when the acid value is lower than or equal to the upper limit of the above range, for example, a moisture amount remaining in the recorded matter can be decreased, and absorption of moisture by the recorded matter under the environment can be suppressed; hence, the laminate strength is estimated to be improved.

In addition, when the acid value is higher than or equal to the lower limit of the above range, by the acid groups of the resin, the glass transition temperature of the resin may be increased in some cases, and hence, the anti-blocking property preferably tends to be further improved.

In addition, the acid value may be measured in accordance with JIS K0070. As a titration device, for example, "AT610" manufactured by Kyoto Electronics Manufacturing Co., Ltd. may be used.

In addition, the glass transition temperature of the specific acrylic-based resin is 20.0° C. to 50.0° C. The glass transition temperature is preferably 23.0° C. to 47.0° C. and more preferably 25.0° C. to 45.0° C. When the glass transition temperature of the specific acrylic-based resin is in the range described above, an appropriate flexibility is likely to be imparted to the fixing resin, a sufficient laminate strength can be secured thereby, and the flexibility is not excessively decreased as the fixing resin, so that the anti-blocking property of the recorded matter can be improved.

The measurement of the glass transition temperature (Tg) of the specific acrylic-based resin is performed in accordance with JIS K7121 (plastic transition temperature measurement method), for example, using a differential scanning calorimeter "DSC7000" manufactured by Hitachi Hi-Tech Science Corporation.

The glass transition temperature of the specific acrylic-based resin can be adjusted such that when the resin is formed by polymerization, the glass transition temperatures (Tgs) of polymers estimated from monomers to be used as raw materials are taken into consideration, and the types and the composition ratios of the monomers are appropriately adjusted. Accordingly, the range of the glass transition temperature (Tg) of the entire resin can be adjusted. In addition, the acid value of the resin can also be adjusted such that while the glass transition temperature (Tg) of the resin is considered so as not to be out of the range described above, the types and the composition ratios of the monomers are appropriately adjusted. In particular, by adjusting the composition ratio of the monomer having an acid group, the acid value can be adjusted.

In the specific acrylic-based resin, a rate of constituent units derived from a vinyl monomer to all constituent units of the specific acrylic-based resin is set preferably 35.0 percent by mass or less, more preferably 30.0 percent by mass or less, even more preferably 25.0 percent by mass or less, and further preferably 20.0 percent by mass or less. In the case described above, the acid value and the glass transition temperature of the resin can be easily adjusted in the respective ranges described above. Accordingly, the laminate strength and the anti-blocking property of an image formed on a low-absorbing recording medium or a non-absorbing recording medium can be further improved. On the other hand, a lower limit of the rate of the constituent units derived from a vinyl monomer to all the constituent units of the specific acrylic-based resin is preferably 0.0 percent by mass or more, more preferably 10.0 percent by mass or more, and further preferably 20.0 percent by mass or more. When the rate of the constituent units derived from a vinyl monomer to all the constituent units of the specific acrylic-based resin is 10.0 percent by mass or more, the effect described above is preferably likely to be obtained.

The vinyl monomer is not particularly limited as long as being a compound having a vinyl group, and for example, a styrene-based monomer, an amine-based vinyl monomer, or a vinyl monomer having an anionic group (such as a carboxy group, a sulfonic acid group, or a phosphoric acid group) may be mentioned. As a particular example of the vinyl monomer, for example, there may be mentioned styrene, 2-methylstyrene, vinyltoluene, ethyl vinyl benzene, vinylnaphthalene, chlorostyrene, vinylpyridine, 2-methyl-5-vinylpyridine, 2-ethyl-5-vinylpyridine, N,N-dimethylaminostyrene, N,N-dimethylaminomethylstyrene, styrene sulfonic acid, vinylphosphonic acid, or vinylphosphate.

In addition, in the specific acrylic-based resin, a rate of constituent units derived from an aromatic (meth)acrylate or an alicyclic (meth)acrylate to all the constituent units of the specific acrylic-based resin is set preferably 40.0 percent by mass or less, more preferably 35.0 percent by mass or less, even more preferably 30.0 percent by mass or less, further preferably 20.0 percent by mass or less, and even further preferably 10 percent by mass or less. Accordingly, the laminate strength and the anti-blocking property of an image formed on a low-absorbing recording medium or a non-absorbing recording medium is more likely to be improved. On the other hand, a lower limit of the rate of the constituent units derived from an aromatic (meth)acrylate or an alicyclic (meth)acrylate to all the constituent units of the specific acrylic-based resin is preferably 0.0 percent by mass or more, more preferably 10.0 percent by mass or more, and further preferably 20.0 percent by mass or more. Since the rate of the constituent units derived from an aromatic (meth)acrylate or an alicyclic (meth)acrylate to all the constituent units of the specific acrylic-based resin is the above range or more, the effect described above is preferably likely to be obtained. In addition, when the rate of the constituent units derived from an aromatic (meth)acrylate or an alicyclic (meth)acrylate to all the constituent units of the specific acrylic-based resin is set in the range described above, the acid value and the glass transition temperature of the resin are preferably likely to be adjusted in the respective ranges described above.

In addition, as the aromatic (meth)acrylate, for example, there may be mentioned an aryl (meth)acrylate ester, such as phenyl (meth)acrylate, o-tolyl (meth)acrylate, m-tolyl (meth)acrylate, p-tolyl (meth)acrylate, 2,3-xylyl (meth)acrylate, 2,4-xylyl (meth)acrylate, 2,5-xylyl (meth)acrylate, 2,6-xylyl (meth)acrylate, 3,4-xylyl (meth)acrylate, 3,5-xylyl (meth)acrylate, 1-naphthyl (meth)acrylate, 2-naphthyl (meth)acrylate, binaphthyl (meth)acrylate, or anthryl (meth)acrylate; an aralkyl (meth)acrylate ester such as benzyl (meth)acrylate; or a phenoxyalkyl (meth)acrylate such as phenoxyethyl (meth)acrylate.

In addition, as the alicyclic (meth)acrylate, for example, there may be mentioned a cycloalkyl (meth)acrylate ester, such as cyclopropyl (meth)acrylate, cyclobutyl (meth)acrylate, cyclopentyl (meth)acrylate, or cyclohexyl (meth)acrylate; or a (meth)acrylate ester having a bicyclo ring, such as isobornyl (meth)acrylate.

Furthermore, a rate of constituent units derived from a long chain aliphatic (meth)acrylate to all the constituent units of the specific acrylic-based resin is set to preferably 30.0 percent by mass or more, more preferably 35.0 percent by mass or more, and further preferably 40.0 percent by mass or more. Accordingly, the laminate strength of an image formed on a low-absorbing recording medium or a non-absorbing recording medium is more likely to be improved. On the other hand, an upper limit of the rate of the constituent units derived from a long chain aliphatic (meth)acrylate to all the constituent units of the specific acrylic-based resin is preferably 50.0 percent by mass or less, more preferably 45.0 percent by mass or less, and further preferably 40.0 percent by mass or less. Since the rate of the constituent units derived from a long chain aliphatic (meth)acrylate to all the constituent units of the specific acrylic-based resin is 50.0 percent by mass or less, the effect described above is preferably likely to be obtained.

In addition, when the rate of the constituent units derived from a long chain aliphatic (meth)acrylate is set in the range described above, the acid value and the glass transition temperature of the resin are preferably likely to be adjusted in the respective ranges described above.

In this case, the long chain aliphatic (meth)acrylate is a (meth)acrylate having a linear or a branched chain hydrocarbon group, and the chain hydrocarbon group has 5 carbon atoms or more. The number of carbon atoms is preferably 6 or more and more preferably 7 or more. In addition, although an upper limit of the number of carbon atoms is not particularly limited, for example, the upper limit is preferably 30 or less, more preferably 25 or less, and further preferably 20 or less.

For example, among alkyl (meth)acrylate esters, a compound having an alkyl group formed of five carbon atoms or more may be mentioned. In more particular, as the long chain aliphatic (meth)acrylate, for example, there may be mentioned n-pentyl (meth)acrylate ester, isopentyl (meth)acrylate ester, n-hexyl (meth)acrylate ester, isohexyl (meth)acrylate ester, n-heptyl (meth)acrylate ester, isoheptyl (meth)acrylate ester, n-octyl (meth)acrylate ester, 2-ethylhexyl (meth)acrylate ester, decyl (meth)acrylate ester, dodecyl (meth)acrylate ester, pentadecyl (meth)acrylate ester, hexadecyl (meth)acrylate ester, heptadecyl (meth)acrylate ester, or octadecyl (meth)acrylate ester.

As the specific acrylic-based resin, an acrylic-based resin dissolved in the white ink composition or dispersed in the form of particles therein as the resin particles may be used. When the specific acrylic-based resin is dispersed in the form of particles as the resin particles, a volume average particle diameter of the resin particles is preferably 20 nm or more. The volume average particle diameter thereof is preferably 300 nm or less. Furthermore, the volume average particle diameter thereof is preferably 50 to 300 nm, more preferably 100 to 200 nm, and even more preferably 100 to 150 nm.

A content of the specific acrylic-based resin in the white ink composition with respect to the total mass of the composition is preferably 1.0 to 15.0 percent by mass, more preferably 5.0 to 15.0 percent by mass, and further preferably 8.0 to 12.0 percent by mass. When the content of the specific acrylic-based resin is in the range described above, by the white ink composition, a recorded matter including a white image more excellent in laminate strength and anti-blocking property can be formed.

1.2.2. Another Acrylic-Based Resin

The white ink composition of this embodiment may include, as the fixing resin, at least one acrylic-based resin other than the specific acrylic-based resin described above. That is, the white ink composition may include, as the fixing resin, an acrylic-based resin having an acid value of less than 50.0 mgKOH/g or more than 100.0 mgKOH/g and a glass transition temperature (Tg) of less than 20.0° C. or more than 50.0° C. Hereinafter, the acrylic-based resin as described above is called another acrylic-based resin.

As the another acrylic-based resin, for example, there may be mentioned Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); 952B, 718A, Movinyl 966A or 975N (trade name, manufactured by Japan Coating Resin Co., Ltd.); Vinyblan 2586 (manufactured by Nisshin Chemical Industry Co., Ltd.); FK-854 (trade name, manufactured by Japan Coating Resin Co., Ltd.); or NipolLX852 or LX874 (trade name, manufactured by Zeon Corporation).

1.2.3. Another Fixing Resin

The white ink composition may include as the fixing resin, at least one resin other than the acrylic-based resins described above.

As the resin which can be used as the fixing resin, for example, a poly(vinyl alcohol), a carboxymethyl cellulose, or a water-soluble polyester may be mentioned as a resin to be dissolved in the white ink composition.

In addition, among the resins which can be used as the fixing resin, as the resin to be dispersed in the form of resin particles in the white ink composition, for example, there may be mentioned resin particles formed from an urethane-based resin, a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, or an ethylene-vinyl acetate-based resin. Although the resin particles as described above are used in the form of an emulsion in many cases, the resin particles may be used in the form of a powder.

When at least one of the resins other than the above specific acrylic-based resin is included in the white ink composition as the fixing resin, a content thereof with respect to the total mass of the white ink composition as a solid content is 0.1 to 10.0 percent by mass, preferably 0.5 to 5.0 percent by mass, and more preferably 1.0 to 3.0 percent by mass. The content of the resin other than the specific acrylic-based resin is set in the range so as not to disturb the function of the specific acrylic-based resin.

The resin other than the specific acrylic-based resin to be included in the white ink composition may be used alone, or at least two types thereof may be used in combination. Furthermore, as the resin other than the specific acrylic-based resin, a resin to be dispersed in the white ink composition in the form of resin particles and a resin to be dissolved therein may be used in combination.

1.3. Other Components

The white ink composition may include other additives, such as an organic solvent, water, a surface tension adjuster, a wax, a pH adjuster, and/or a fungicide/antiseptic agent.

1.3.1. Organic Solvent

The white ink composition may include an organic solvent. As one of functions of the organic solvent, for example, an improvement in wettability of the white ink composition to a recording medium and an enhancement of a moisture retaining property of the white ink composition may be mentioned. When the organic solvent is included, the moisture retaining property of the ink is obtained, a clogging resistance is improved, and a drying property is improved; hence, an amount of an organic solvent remaining on the recording medium can be decreased, and the fastness of the recorded matter is improved. In addition, since the surface tension of the ink is decreased, when the ink is ejected from an ink jet recording head, the ink separated from a nozzle in the form of liquid droplets is likely to fly, and since the wettability to the recording medium is improved, spreadability of the ink droplets can be improved.

As the organic solvent, for example, there may be mentioned an ester, an alkylene glycol ether, a cyclic ester, a nitrogen-containing solvent, a polyvalent alcohol, or an alcohol-based solvent.

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, or dipropylene glycol acetate propionate.

As the cyclic ester, for example, there may be mentioned a cyclic ester (a lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonanolactone, ε-nonalactone, or ε-decalactone, and in addition, a compound in which a hydrogen atom of a methylene group adjacent to the carbonyl group of one of those cyclic esters mentioned above is substituted by an alkyl group having 1 to 4 carbon atoms may also be mentioned.

As the nitrogen-containing solvent, for example, a non-cyclic amide or a cyclic amide may be mentioned. As the non-cyclic amide, for example, an alkoxyalkylamide may be mentioned.

As the alkoxyalkylamide, for example, there may be mentioned 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

In addition, as the non-cyclic amide, an alkoxyalkylamide which is a compound represented by the following formula (1) is also preferably used.

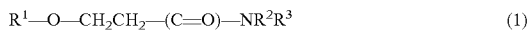

$$R^1\text{—O—CH}_2\text{CH}_2\text{—(C=O)—NR}^2R^3 \quad (1)$$

In the above formula (1), $R^1$ represents an alkyl group having 1 to 4 carbon atoms, and $R^2$ and $R^3$ each independently represent a methyl group or an ethyl group. The "alkyl group having 1 to 4 carbon atoms" may be a linear or branched alkyl group, and for example, a methyl group, an ethyl group, an n-propyl group, an iso-propyl group, an n-butyl group, a sec-butyl group, an iso butyl group, or a tert-butyl group may be mentioned. The compound represented by the above formula (1) may be used alone, or at least two types thereof may be used in combination.

As the cyclic amide, a lactam may be mentioned, and for example, 2-pyrollidone, 1-methyl-2-pyrrolidone, 1-ethyl-2-pyrrolidone, 1-propyl-2-pyrrolidone, 1-butyl-2-pyrrolidone, or 1-(2-hydroxyethyl)-2-pyrrolidone may be mentioned. Those compounds preferably promote a film formation of high molecular weight particles which will be described later, and in particular, 1-(2-hydroxyethyl)-2-pyrrolidone is more preferable.

As the alkylene glycol ether, a monoether or a diether of an alkylene glycol may be used, and an alkyl ether is preferable. In particular, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methylethyl ether, diethylene glycol methylbutyl ether, triethylene glycol dimethyl ether, triethylene glycol diethyl ether, triethylene glycol dibutyl ether, triethylene glycol methylbutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

When the glycol ether is used, the number of carbon atoms thereof is preferably 12 or less, more preferably 8 or less, and further preferably 6 or less. A lower limit thereof is preferably 2 or more, more preferably 3 or more, and further preferably 5 or more. The number of carbon atoms is the number of carbon atoms in its molecule.

When the glycol ether as described above is used, a recorded matter having a white image more excellent in anti-blocking property is likely to be formed. The glycol portion of the glycol ether may be formed by condensation of hydroxy groups of alkylene glycol molecules. The number of condensations of alkylene glycols is preferably 2 to 4 and more preferably 2 to 3. In addition, the ether portion of the glycol ether is preferably an alkyl ether, an alkyl having 1 to 4 carbon atoms is preferable, and an alkyl having 2 to 4 carbon atoms is more preferable.

Since having excellent permeability and ink wettability to a recording medium, the alkylene glycol ether preferably forms an excellent image quality. From this point of view, in particular, a monoether is preferable.

When the ink includes a nitrogen-containing solvent and/or a glycol ether having 8 carbon atoms or less, the film formation of the resin is excellent, and for example, the adhesion, the laminate strength, and the anti-blocking property are preferably more excellent. A content of the nitrogen-containing solvent and/or the glycol ether having 8 carbon atoms or less in the ink is preferably 1 percent by mass or more, more preferably 5 percent by mass or more, and further preferably 10 percent by mass or more. In addition, the content described above is preferably 40 percent by mass or less, more preferably 30 percent by mass or less, and further preferably 20 percent by mass or less. In addition, the content of the nitrogen-containing solvent in the ink is also preferably set in the range described above. In addition, the content of the glycol ether having 8 carbon atoms or less is also preferably set in the range described above.

As the polyvalent alcohol, for example, there may be mentioned 1,2-alkaindiol, such as ethylene glycol, propylene glycol (synonym: propane-1,2-diol), 1,2-butanediol, 1,2-pentanediol, 1,2-hexanediol, 1,2-heptanediol, or 1,2-octandiol; a polyvalent alcohol (polyol) other than 1,2-alkanediol, such as diethylene glycol, dipropylene glycol, 1,3-propanediol, 1,3-butanediol, (synonym: 1,3-butylene glycol), 1,4-butanediol, 2,3-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, or glycerin.

The polyvalent alcohol may be classified into an alkanediol and a polyol.

The alkanediol is a diol having 5 carbon atoms or more. The number of carbon atoms of the alkane is preferably 5 to 15, more preferably 6 to 10, and further preferably 6 to 8. In particular, a 1,2-alkanediol is preferable.

The polyol is a polyol of an alkane having 4 carbon atoms or more or an intermolecular condensate between hydroxy groups of polyols of an alkane having 4 carbon atoms or more. The number of carbon atoms of the alkane is preferably 2 to 3. The number of hydroxy groups in the polyol molecule is 2 or more, preferably 5 or less, and more preferably 3 or less. When the polyol is the above intermolecular condensate, the number of intermolecular condensations is 2 or more, preferably 4 or less, and more preferably 3 or less. The polyvalent alcohol may be used alone, or at least two types thereof may be used in combination.

The alkanediol and the polyol each function primarily as a penetrating solvent and/or a moisturizing solvent. However, the alkanediol tends to function strongly as the penetrating solvent, and the polyol tends to function strongly as the moisturizing solvent.

Since the alkanediol functions strongly as the penetrating solvent and has a superior ink wettability to a recording medium, the spreadability of the ink is excellent, and the image quality is preferably excellent.

The polyol has a particularly high hydrophilic property, is able to particularly enhance the moisture retaining property, and has a particularly excellent clogging resistance. In particular, when a polyol having a standard boiling point of 280.0° C. or less is used, a preferable drying property can be obtained, and the fastness of the recorded matter is likely to be improved.

In addition, as the alcohol-based solvent, for example, there may be mentioned methanol, ethanol, isopropyl alcohol, 1-propanol, 1-buanol, 2-butanol, 3-pentanol, 2-methyl-1-butanol, 2-methyl-2-butanol, isoamyl alcohol, 3-methyl-2-butanol, 3-methoxy-3-methyl-1-butanol, 4-methyl-2-pentanol, allyl alcohol, 1-hexanol, 1-heptanol, 2-heptanol, or 3-heptanol.

In the white ink composition, the organic solvent mentioned above may be used alone, or at least two types thereof may be used in combination. When at least two types of organic solvents are used, a content of the organic solvents is the total content thereof.

When the white ink composition includes the organic solvent, the total content thereof with respect to the total mass of the ink is preferably 40 percent by mass or less, more preferably 30 percent by mass or less, even more preferably 13.0 percent by mass or less, further preferably 10.0 percent by mass or less, even further preferably 7.0 percent by mass or less, particularly preferably 6.0 percent by mass or less, and even particularly preferably 5.0 percent by mass or less. In this case, the fastness of the recorded matter is preferably further improved. On the other hand, a lower limit of the total content described above is preferably 1.0 percent by mass or more, more preferably 3.0 percent by mass or more, even more preferably 5.0 percent by mass or more, further preferably 6.0 percent by mass or more, even further preferably 10 percent by mass or more, and particularly preferably 20 percent by mass or more. In the case described above, the clogging resistance and the image quality are preferably further improved.

A content of a polyol having a standard boiling point of more than 280° C. in the ink is preferably not more than 2.0 percent by mass, more preferably not more than 1.0 percent by mass, and further preferably not more than 0.5 percent by mass. A lower limit of the polyol described above is 0.0 percent by mass.

In addition, the content of the organic solvent having a standard boiling point of more than 280° C. in the ink may be preferably set in the range described above. In the case described above, the adhesion, the laminate strength, the anti-blocking property, and the like are preferably further improved.

1.3.2. Water

The white ink composition may include water. When the white ink composition is an aqueous composition, as one primary solvent component, water is included. In the case described above, water is included as a primary solvent component and is a component to be vaporized away by drying. As the water, purified water, such as ion-exchanged water, ultrafiltration water, reverse osmosis water, or distilled water, or water, such as ultrapure water, from which ionic impurities are removed as much as possible is preferable. In addition, when water sterilized by UV irradiation or addition of hydrogen peroxide is used, generation of fungi and/or bacteria can be preferably suppressed in the case in which the white ink composition is stored for a long time. When water is included in the white ink composition to form an aqueous composition, a content of the water with respect to the total mass of the white ink composition is preferably 50 percent by mass or more, more preferably 70.0 percent by mass, even more preferably 75.0 percent by mass, further preferably 80.0 to 98 percent by mass, and even further preferably 85.0 to 95.0 percent by mass.

1.3.3. Surface Tension Adjuster

The white ink composition may include a surface tension adjuster. The surface tension adjuster has a function to decrease the surface tension of the white ink composition and to improve the wettability to a recording medium or an underlayer. Among the surface tension adjusters, for example, an acetylene glycol-based surface tension adjuster, a silicone-based surface tension adjuster, or a fluorine-based surface tension adjuster may be preferably used.

Although the acetylene glycol-based surface tension adjuster is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals, Inc.); Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

Although the silicone-based surface tension adjuster is not particularly limited, for example, a polysiloxane-based compound may be preferably mentioned. Although the polysiloxane-based compound is not particularly limited, for example, a polyether modified organosiloxane may be mentioned. As a commercially available product of the polyether modified organosiloxane, for example, there may be mentioned BYK-306, BYK-307, BYK-333, BYK-341, BYK-345, BYK-346, or BYK-348 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

As the fluorine-based surface tension adjuster, a fluorine modified polymer is preferably used, and for example, BYK-3440 (trade name, manufactured by BYK Japan KK); Surflon S-241, S-242, or S-243 (trade name, manufactured by AGC SEIMI CHEMICAL CO., LTD.); or Ftergent 215M (trade name, manufactured by Neos Co., Ltd.) may be mentioned.

When the surface tension adjuster is included in the white ink composition, at least two types thereof may be included. When the surface tension adjuster is included in the white ink composition, the content with respect to the total mass thereof is preferably 0.1 to 2.0 percent by mass, more preferably 0.2 to 1.5 percent by mass, and even more preferably 0.3 to 1.0 percent by mass.

The compounds described above by way of example as the surface tension adjuster are regarded not to be included in the organic solvents described above.

1.3.4. Wax

The white ink composition may include a wax. Since the wax has a function to impart lubricity to an image of the white ink composition, for example, the image of the white ink composition can be suppressed from being peeled away.

As a component forming the wax, for example, a plant/animal-based wax, such as a carnauba wax, a candelilla wax, a bees wax, a rice wax, or a lanoline; a petroleum-based wax, such as a paraffin wax, a microcrystalline wax, a polyethylene wax, an oxidized polyethylene wax, or a petrolatum: a mineral-based wax, such as a montan wax or an ozokerite; a synthetic wax, such as a carbon wax, a Hoechst wax, a polyolefin wax, or an amide stearate; a natural/synthetic wax emulsion, such as an α-olefin/maleic anhydride copolymer; or a blended wax may be used alone, or at least two types thereof may be used in combination. Among those mentioned above, since an effect of enhancing the fixing property to a soft packaging film which will be described later is excellent, a polyolefin wax (in particular, a polyethylene wax or a polypropylene wax) or a paraffin wax is preferably used.

As the wax, a commercially available product may be used without any modification, and for example, Nopcoat PEM-17 (trade name, manufactured by San Nopco Limited); Chemipearl W4005 (trade name, manufactured by Mitsui Chemicals Inc.); or BYK AQUACER 515, 539, or 593 (trade name; manufactured by BYK Japan KK) may be mentioned.

In addition, a wax having a melting point of preferably 50.0° C. to 200.0° C., more preferably 70.0° C. to 180.0° C., or further preferably 90.0° C. to 150.0° C. is preferably used.

The wax may be supplied in the form of an emulsion or a suspension. When the wax is used, a content thereof with respect to the total mass of the white ink composition in a solid content is 0.1 to 10.0 percent by mass, preferably 0.5 to 5.0 percent by mass, and more preferably 0.5 to 2.0 percent by mass. When the content of the wax is in the range described above, for example, the lubricity is likely to be imparted to the image.

1.3.5. pH Adjuster

The white ink composition of this embodiment may include a pH adjuster. Since the pH adjuster is included, for example, elution of impurities from a member forming an ink flow path of a recording apparatus may be suppressed or promoted, and hence, a washing property of the white ink composition may be adjusted. As the pH adjuster, for example, there may be mentioned an urea, a betaine, an amine, a morpholine, a piperazine, or an alcohol, such as triethanolamine, may be mentioned. As the urea, for example, there may be mentioned urea, ethyleneurea, tetramethylurea, thiourea, or 1,3,-dimethyl-2-imidazolidinone, and as the betaine, for example, trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, or acetyl carnitine may be mentioned. As the amine, for example, diethanolamine, triethanolamine, or triisopropanolamine may be mentioned.

The compounds described by way of example as the pH adjuster are regarded not to be included in the organic solvents described above. For example, although being a liquid at ordinary temperature having a standard boiling point of approximately 208° C., triethanolamine is not handled as the organic solvent described above.

1.3.6. Fungicide and Antiseptic Agent

The white ink composition of this embodiment may include an antiseptic agent. Since the antiseptic agent is included, proliferation of fungi and/or bacteria can be suppressed, and a storage stability of the ink composition can be further improved. Accordingly, for example, the white ink composition is likely to be used as a maintenance liquid for maintenance of a recording apparatus which is not used for a long time. As a preferable example of the antiseptic agent, for example, Proxel CRL, Proxel BDN, Proxel GXL, Proxel XL-2, Proxel IB, or Proxel TN (manufactured by Lonza Japan) may be mentioned.

1.3.7. Other Additives

The white ink composition may include, if needed, various types of additives, such as a chelating agent, an antirust agent, a fungicide, an antioxidant, a reduction inhibitor, and an evaporation promoter.

As the chelating agent, for example, an ethylenediaminetetraacetate (EDTA) salt, a nitrilotriacetate salt of ethylenediamine, a hexametaphosphate, a pyrophosphate, or a metaphosphate may be mentioned.

1.4. Method for Manufacturing White Ink Composition

Although a method for manufacturing the white ink composition of this embodiment is not particularly limited, for example, the white ink composition may be manufactured such that the ink components described above are mixed together in an arbitrary order, and if needed, impurities are removed by filtration or the like. As a mixing method of the components, a method in which after the components are sequentially added in a container equipped with a stirring device, such as a mechanical stirrer or a magnetic stirrer, mixing is performed by stirring may be preferably used.

1.5. Physical Properties of White Ink Composition

In consideration of the balance between the image quality and the reliability of the ink jet recording ink, the surface tension of the white ink composition according to this embodiment at 20° C. is preferably 20 to 40 mN/m and more preferably 20 to 35 mN/m. In addition, the measurement of the surface tension may be performed such that for example, by using an automatic surface tension meter CBVP-Z (trade name, manufactured by Kyowa Interface Science Co., Ltd.), a surface tension at which a platinum plate is wetted with the ink is confirmed in an environment at 20° C.

In addition, from the same point as described above, the viscosity of the white ink composition according to this embodiment at 20° C. is preferably 1.0 to 20.0 mPa·s and more preferably 3.0 to 15.0 mPa·s. In addition, the measurement of the viscosity is performed such that in an environment at 20° C., the viscosity is measured, for example, by using a viscoelastic tester MCR-300 (trade name, manufactured by Pysica).

1.6. Applications of White Ink Composition

When the white ink composition of this embodiment is adhered to a recording medium, a white image can be formed. Although the recording medium to which the white ink composition is adhered is not particularly limited, a low-absorbing recording medium or a non-absorbing recording medium may be mentioned, and the low-absorbing recording medium or the non-absorbing recording medium is preferable. As an absorbing recording medium, for example, absorptive paper or cloth may be mentioned.

The low-absorbing recording medium and the non-absorbing recording medium indicate a recording medium hardly absorbing an ink and a recording medium absorbing no ink, respectively. From a quantitative point of view, the low-absorbing recording medium indicates a "recording medium having a water absorbing amount of 10 mL/m$^2$ or less from a contact start to a point of 30 msec$^{1/2}$ by Bristow method". This Bristow method is a most popular measurement method of a liquid absorption amount in a short time and has also been employed by Japan Technical Association of the Pulp and Paper Industry (JAPAN TAPPI). The details of the test method has been disclosed in Standard No. 51 "Paper and Paperboard-Liquid Absorption Test Method-Bristow Method", JAPAN TAPPI PAPER AND PULP TEST METHODS, 2000. As the recording medium having a low-absorbing property as described above, for example, there may be mentioned a recording medium including a recording surface on which an ink receiving layer is not provided or a recording medium including a recording surface on which a coating layer having a low ink absorbing property is provided.

The white ink composition of this embodiment is effectively used on the low-absorbing recording medium. Although the low-absorbing recording medium is not particularly limited, for example, coating paper having a surface provided with a coating layer to receive an oily ink may be mentioned. Although the coating paper is not particularly limited, for example, printing paper, such as art paper, coated paper, or a matte paper, may be mentioned.

In addition, although the non-absorbing recording medium is not particularly limited, for example, a plastic film having no ink absorbing layer, a sheet in which a plastic is coated on a base material such as paper, or a sheet in which a plastic film is adhered to a base material may be mentioned. As the plastic in this case, for example, a poly(vinyl chloride), a poly(ethylene terephthalate), a polycarbonate, a polystyrene, a polyurethane, a polyolefin, or a nylon may be mentioned. As the polyolefin, for example, a polyethylene or a polypropylene may be mentioned. Although the polyolefin preferably has a film flexibility, an ink fixing property is difficult to obtain; however, according to the white ink composition of this embodiment, a preferable fastness can be obtained.

In particular, when the recording medium is formed from one of a poly(ethylene terephthalate), a polyolefin, and a nylon, in particular, the anti-blocking property and the laminate strength are required, and hence, this embodiment is effective.

When the white ink composition of this embodiment is used, even on the ink non-absorbing recording medium or the ink low-absorbing recording medium, a predetermined image having a preferable fixing property and a preferable abrasion resistance can be formed rapidly. In addition, since the recording medium as described above is difficult to absorb the solvent component of the ink, an organic solvent remaining on the recording medium may have adverse influence on the fastness, such as the abrasion resistance of the recorded matter and the fixing property; however, according to the white ink composition of this embodiment, an excellent fastness is preferably obtained.

In addition, the recording medium may have either a bag shape or a sheet shape. In addition, in an ink jet recording method of this embodiment, the recording medium to which the ink composition is adhered is more preferably primarily formed from a polyolefin (such as a polyethylene or a polypropylene). In general, although the recording medium as described above is a recording medium to which the ink composition is difficult to adhere, according to the white ink composition of this embodiment, an image having preferable fixing property and abrasion resistance can be formed on the recording medium described above, and hence, the effect of obtaining preferable fixing property and abrasion resistance is even further significant. In addition, a surface treatment, such as a corona treatment or a primer treatment, may be performed on the recording medium in advance, and by the surface treatment as described above, a peeling property of the ink from the recording medium may be improved in some cases.

Furthermore, when the white ink composition of this embodiment is adhered to the recording medium, and the recorded matter is formed, a laminate treatment may be performed at least on a recorded surface of the recorded matter. When the laminate treatment is performed on the recorded surface of the recorded matter recorded by using the white ink composition of this embodiment, the laminate strength can be preferably improved.

According to the white ink composition of this embodiment, a recorded matter including a white image having preferable laminate strength and anti-blocking property can be formed. That is, since the white ink composition includes a fixing resin having an acid value in a predetermined range, the laminate strength is improved, and since the white ink composition includes a fixing resin having a glass transition temperature in a predetermined range, a recorded matter also having a preferable anti-blocking property can be formed.

1.7. Ink Set

In this embodiment, an ink set including at least one white ink composition and at least one non-white ink composition may be formed. The ink set indicates that a plurality of inks is used as a set for recording. That is, at least two types of inks used in combination as a set for recording is called the ink set.

The inks provided in the ink set may be separately received in respective ink containers. As the ink container, for example, a pack, a bottle, or a jar may be mentioned. Alternatively, a cartridge to be fitted to a printer may also be used.

2. RECORDING METHOD

A recording method according to this embodiment includes a step of adhering the white ink composition described above to a recording medium by an ink jet method.

In the step of adhering the white ink composition to a recording medium by an ink jet method, from an ink jet head of a printer, ink droplets (liquid droplets) of the white ink composition are adhered to the recording medium. In this step, the ink droplets in a predetermined mass are ejected at a predetermined intermittent timing to be adhered to the recording medium, and a predetermined design, such as an image, a character, a pattern, a color, or the like, is formed (recorded). Accordingly, a recorded matter including a white image having excellent laminate strength and anti-blocking property can be obtained.

The adhesion of the white ink composition by an ink jet method may be performed by a serial type recording apparatus mounting a serial type ink jet head or a line type recording apparatus mounting a line type ink jet head.

The recording method of this embodiment may include a non-white ink adhesion step of adhering a non-white ink composition containing a non-white colorant to the recording medium by ejection thereof from the ink jet head.

In addition, for example, the recording method may further include a treatment liquid adhesion step of adhering a treatment liquid composition to the recording medium by ejection thereof from the ink jet head and/or a clear ink adhesion step of adhering a clear ink composition containing no colorant to the recording medium by ejection thereof from the ink jet head.

In addition, the recording method may further include, for example, a primary drying step of adhering the ink to a heated recording medium, a secondary drying step of heating the recording medium after the ink is adhered thereto, and a laminating step which will be described later, and those steps described above each may be performed at least two times.

In addition, according to the recording method of this embodiment, when a transparent plastic film is used as the recording medium, after the white ink composition is adhered to the recording medium, the non-white ink composition may be adhered on a white image thus formed so that the white image functions as an underlayer (background shielding layer) when viewed from a recording surface side of the recording medium. Furthermore, according to the recording method of this embodiment, when a transparent plastic film is used as the recording medium, after the non-white ink composition is adhered to the recording medium, the white ink composition may be adhered on a non-white image thus formed so that the white image functions as an underlayer (background shielding layer) when viewed from a side opposite to the recording surface side of the recording medium.

The laminate step may be performed such that for example, a protective film is laminated so as to be stuck to a recording surface of the recording medium to which the white ink composition is at least adhered. Alternatively, although not particularly limited, after a known adhesive is adhered to the recorded surface of the recorded matter, a film may be stuck thereto, or a film to which an adhesive is adhered may be stuck to the recorded surface of the recorded matter. Furthermore, a laminate treatment may be performed such that a molten resin obtained by melting a film is extruded on the recorded surface of the recorded matter to form a film thereon.

As a material such as a film used for the laminate, for example, a resin-made film may be used. In addition, in this embodiment, after the recording, a recording medium to which the white ink composition is adhered may be used as the recorded matter without being laminated.

3. RECORDING APPARATUS

FIGURE is a schematic cross-sectional view showing the structure of one example of an ink jet recording apparatus which can be used for the recording method of the present disclosure. As shown in FIGURE, an ink jet recording apparatus 1 includes an ink jet head 2, an IR heater 3, a platen and a platen heater 4, a heating heater 5, a cooling fan 6, a pre-heater 7, and a blast fan 8. All the operations of the ink jet recording apparatus 1 are controlled by a control portion CONT not shown. The recording apparatus 1 shown in FIGURE is an example of a line printer, and while a recording medium 10 is transported in a transport direction X, an ink is ejected from the ink jet head 2 for recording. By the platen heater 4, the pre-heater 7, the blast fan 8, the IR heater 3, and the like, primary drying is performed, and by the heating heater 5, secondary drying is performed.

4. EXAMPLES AND COMPARATIVE EXAMPLES

Hereinafter, although the present disclosure will be described in detail with reference to Examples, the present disclosure is not limited thereto. Hereinafter, unless otherwise particularly noted, "part(s)" and "%" are each on a mass basis. In addition, the evaluation was performed in an environment at a temperature of 25.0° C. and a relative humidity of 40.0% unless otherwise particularly noted.

4.1. Preparation of Fixing Resin

Fixing resins (R1 to R35) shown in Tables 1 to 3 were each prepared as described below. In Tables 1 to 3, the types of monomers and the amounts thereof used in each Example are described.

Formation of R1

After a reaction chamber equipped with a stirring motor, a stirring blade, a thermo sensor, and a reflux condenser was purged with nitrogen, 500 g of methyl ethyl ketone (hereinafter, referred to as "MEK" in some cases) was charged therein, and the inside temperature was then increased to 77° C. with stirring. In accordance with the mass ratio shown in the table, a total amount of 500 g of monomers was added. That is, 60 g of methacrylic acid (hereinafter, referred to as "MA" in some cases), 315 g of 2-ethylhexyl methacrylate (hereinafter, referred to as "2-EHMA" in some cases), and 125 g of styrene (hereinafter, referred to as "St" in some cases) were added. Furthermore, 8 g of di-tert-butyl peroxide (hereinafter, referred to as "per-D" in some cases) was also added. Those monomers were dripped over 4 hours. After the dripping was completed, the inside temperature was maintained at 77° C. for 1 hours, the reflux condenser was changed to a distillation tube, and remaining monomers and solvent in the chamber were removed at a normal pressure or at an appropriate reduced pressure until the inside temperature reached 100° C. Subsequently, cooling was performed to room temperature, so that Resin R1 was obtained.

The acid value of Resin R1 measured based on JIS Standards was 78 mgKOH/g. In addition, the weight average molecular weight and the glass transition temperature of Resin R1 were 17,000 and 30° C., respectively. Those values are shown in the table.

Formation of R2 to R34

In the example of the above R1, except for that while the total amount of 500 g of the monomers was not changed, the mass ratio of each monomer was changed in accordance with that shown in the table, Resin R2 to Resin R34 were each prepared in a manner similar to that described above. The molecular weights thereof were each approximately the same as that of Resin R1. The acid values and the glass transition temperatures thereof were shown in the tables.

After the resins obtained as R1 to R34 were each mixed with water at ordinary temperature, the pH thereof was adjusted by neutralization with a base, such as sodium hydroxide, potassium hydroxide, or ammonia, with stirring, so that a resin dispersion liquid in which the resin was dispersed in water was obtained. In addition, as was the case of Resin R1, in the process of preparing and dispersing the resin, the average particle diameter of Resin R35 was adjusted by stirring with heating and/or by increasing a stirring time.

In addition, in Tables 1 to 3, the volume average particle diameter of resin particles, and the amount of styrene, the amounts of an aromatic and an alicyclic acrylate, and the amount of a long chain aliphatic acrylate in the monomer composition are shown.

TABLE 1

| FIXING RESIN | R1 | R2 | R3 | R4 | R5 | R6 | R7 | R8 | R9 | R10 | R11 | R12 |
|---|---|---|---|---|---|---|---|---|---|---|---|---|
| ACRYLIC ACID | — | — | — | — | — | — | — | — | — | — | — | — |
| n-BUTYL ACRYLATE | — | — | — | 13.0 | — | — | — | — | — | 13.0 | — | — |
| 2-ETHYLHEXYL ACRYLATE | — | — | — | — | 13.0 | — | — | — | — | — | 13.0 | — |
| BENZYL ACRYLATE | — | — | — | — | — | — | — | — | — | — | — | — |
| METHACRYLIC ACID | 12.0 | 8.0 | 15.0 | 12.0 | 12.0 | 12.0 | 12.0 | 8.0 | 15.0 | 12.0 | 12.0 | 12.0 |
| n-BUTYL METHACRYLATE | — | — | — | — | — | — | — | — | — | — | — | — |
| 2-ETHYLHEXYL METHACRYLATE | 63.0 | 67.0 | 60.0 | 50.0 | 50.0 | 55.0 | 63.0 | 67.0 | 60.0 | 50.0 | 50.0 | 55.0 |
| CYCLOHEXYL METHACRYLATE | — | — | — | — | — | — | — | — | — | — | — | — |
| BENZYL METHACRYLATE | — | — | — | — | — | — | — | — | — | — | — | — |
| METHYL METHACRYLATE | — | — | — | — | — | — | 25.0 | 25.0 | 25.0 | 25.0 | 25.0 | 33.0 |
| STYRENE | 25.0 | 25.0 | 25.0 | 25.0 | 25.0 | 33.0 | — | — | — | — | — | — |
| TOTAL | 100 | 100 | 100 | 100 | 100 | 100 | 100 | 100 | 100 | 100 | 100 | 100 |
| Tg (° C.) | 30 | 23 | 35 | 21 | 22 | 38 | 30 | 24 | 35 | 21 | 22 | 39 |
| ACID VALUE (mgKOH/g) | 78 | 52 | 98 | 78 | 78 | 78 | 78 | 52 | 98 | 78 | 78 | 78 |
| VOLUME AVERAGE PARTICLE DIAMETER (nm) | 125 | 129 | 134 | 130 | 124 | 126 | 132 | 118 | 136 | 124 | 118 | 135 |
| STYRENE AMOUNT (PERCENT BY MASS) | 25.0 | 25.0 | 25.0 | 25.0 | 25.0 | 33.0 | — | — | — | — | — | — |
| AROMATIC/ALICYCLIC (METH)ACRYLATE AMOUNT (PERCENT BY MASS) | — | — | — | — | — | — | — | — | — | — | — | — |
| LONG CHAIN ALIPHATIC (METH)ACRYLATE AMOUNT (PERCENT BY MASS) | 63.0 | 67.0 | 60.0 | 50.0 | 63.0 | 55.0 | 63.0 | 67.0 | 60.0 | 50.0 | 63.0 | 55.0 |

TABLE 2

| FIXING RESIN | R13 | R14 | R15 | R16 | R17 | R18 | R19 | R20 | R21 | R22 | R23 | R24 |
|---|---|---|---|---|---|---|---|---|---|---|---|---|
| ACRYLIC ACID | — | — | — | — | — | — | — | — | 10.0 | 10.0 | — | — |
| n-BUTYL ACRYLATE | — | — | — | — | — | — | — | — | — | — | — | — |
| 2-ETHYLHEXYL ACRYLATE | — | — | — | — | — | — | — | — | — | — | 43.0 | 43.0 |
| BENZYL ACRYLATE | — | — | — | 19.0 | — | 19.0 | — | — | — | — | — | — |
| METHACRYLIC ACID | 12.0 | 12.0 | 12.0 | 12.0 | 12.0 | 12.0 | 12.0 | 12.0 | — | — | 12.0 | 12.0 |
| n-BUTYL METHACRYLATE | — | — | — | — | — | — | 13.0 | 13.0 | — | — | — | — |
| 2-ETHYLHEXYL METHACRYLATE | 63.0 | 50.0 | 50.0 | 37.0 | 63.0 | 50.0 | 50.0 | 50.0 | 65.0 | 65.0 | 20.0 | 20.0 |
| CYCLOHEXYL METHACRYLATE | 25.0 | 25.0 | — | — | — | — | — | — | — | — | — | — |
| BENZYL METHACRYLATE | — | — | 25.0 | 19.0 | 25.0 | 19.0 | — | — | — | — | — | — |
| METHYL METHACRYLATE | — | — | — | — | — | — | — | 25.0 | — | 25.0 | — | 25.0 |
| STYRENE | — | 13.0 | 13.0 | 13.0 | — | — | 25.0 | — | 25.0 | — | 25.0 | — |
| TOTAL | 100 | 100 | 100 | 100 | 100 | 100 | 100 | 100 | 100 | 100 | 100 | 100 |
| Tg (° C.) | 27 | 40 | 34 | 34 | 21 | 21 | 34 | 35 | 21 | 21 | 5 | 6 |
| ACID VALUE (mgKOH/g) | 78 | 78 | 78 | 78 | 78 | 78 | 78 | 78 | 78 | 78 | 78 | 78 |
| VOLUME AVERAGE PARTICLE DIAMETER (nm) | 131 | 115 | 140 | 132 | 117 | 125 | 120 | 119 | 129 | 134 | 108 | 146 |
| STYRENE AMOUNT (PERCENT BY MASS) | — | 13.0 | 13.0 | 13.0 | — | — | 25.0 | — | 25.0 | — | 25.0 | — |
| AROMATIC/ALICYCLIC (METH)ACRYLATE AMOUNT (PERCENT BY MASS) | 25.0 | 25.0 | 25.0 | 38.0 | 25.0 | 38.0 | — | — | — | — | — | — |
| LONG CHAIN ALIPHATIC (METH)ACRYLATE AMOUNT (PERCENT BY MASS) | 63.0 | 50.0 | 50.0 | 37.0 | 63.0 | 50.0 | 50.0 | 50.0 | 65.0 | 65.0 | 63.0 | 63.0 |

TABLE 3

| FIXING RESIN | R25 | R26 | R27 | R28 | R29 | R30 | R31 | R32 | R33 | R34 | R35 |
|---|---|---|---|---|---|---|---|---|---|---|---|
| ACRYLIC ACID | — | — | — | — | — | — | 4.0 | 4.0 | 20.0 | 20.0 | — |
| n-BUTYL ACRYLATE | — | — | — | — | — | — | — | — | — | — | — |
| 2-ETHYLHEXYLACRYLATE | — | — | — | — | 25.0 | 25.0 | — | — | 25.0 | 25.0 | — |
| BENZYL ACRYLATE | — | — | — | — | — | — | — | — | — | — | — |
| METHACRYLIC ACID | 12.0 | 12.0 | 5.0 | 5.0 | 25.0 | 25.0 | — | — | — | — | 12.0 |
| n-BUTYL METHACRYLATE | — | — | — | — | — | — | — | — | — | — | — |
| 2-ETHYLHEXYL METHACRYLATE | 38.0 | 38.0 | 63.0 | 63.0 | 25.0 | 25.0 | 65.0 | 65.0 | 25.0 | 25.0 | 63.0 |
| CYCLOHEXYL METHACRYLATE | — | — | — | — | — | — | — | — | — | — | — |
| BENZYL METHACRYLATE | — | — | — | — | — | — | — | — | — | — | — |
| METHYL METHACRYLATE | — | 50.0 | — | 32.0 | — | 25.0 | — | 31.0 | — | 30.0 | — |
| STYRENE | 50.0 | — | 32.0 | — | 25.0 | — | 31.0 | — | 30.0 | — | 25.0 |
| TOTAL | 100 | 100 | 100 | 100 | 100 | 100 | 100 | 100 | 100 | 100 | 100 |
| Tg (° C.) | 58 | 60 | 25 | 26 | 36 | 36 | 20 | 21 | 21 | 22 | 30 |
| ACID VALUE (mgKOH/g) | 78 | 78 | 33 | 33 | 163 | 163 | 31 | 31 | 156 | 156 | 78 |
| VOLUME AVERAGE PARTICLE DIAMETER (nm) | 109 | 105 | 142 | 126 | 121 | 149 | 130 | 125 | 142 | 136 | 80 |
| STYRENE AMOUNT (PERCENT BY MASS) | 50.0 | — | 32.0 | — | 25.0 | — | 31.0 | — | 30.0 | — | 25.0 |
| AROMATIC/ALICYCLIC (METH)ACRYLATE AMOUNT (PERCENT BY MASS) | — | — | — | — | — | — | — | — | — | — | — |
| LONG CHAIN ALIPHATIC (METH)ACRYLATE AMOUNT (PERCENT BY MASS) | 38.0 | 38.0 | 63.0 | 63.0 | 50.0 | 50.0 | 65.0 | 65.0 | 50.0 | 50.0 | 63.0 |

4.2. Preparation of Ink Composition

After components were charged in a container to have one of the compositions shown in Tables 4 to 6 and were then mixed by stirring for 2 hours with a magnetic stirrer, filtration was performed using a 5.0-μm PTFE-made membrane filter, so that one of white ink compositions (W1 to W48) and no-white ink compositions (C1 and C2) was obtained. The numerical values in Tables 4 to 6 each represent percent by mass. As water, ultrapure water was used and was added so that the total of each ink composition was 100 percent by mass.

TABLE 4

| | | COMPOSITION No. | | | | | | | | |
|---|---|---|---|---|---|---|---|---|---|---|
| | | W1 | W2 | W3 | W4 | W5 | W6 | W7 | W8 | W9 |
| COLORANT | WHITE PIGMENT DISPERSION | 15.0 | 15.0 | 15.0 | 15.0 | 15.0 | 15.0 | 15.0 | 15.0 | 15.0 |
| | P.B. 15:3 | — | — | — | — | — | — | — | — | — |
| FIXING RESIN | FIXING RESIN DISPERSION | R1 | R2 | R3 | R4 | R5 | R6 | R7 | R8 | R9 |
| | BLENDING AMOUNT (SOLID CONTENT) | 10.0 | 10.0 | 10.0 | 10.0 | 10.0 | 10.0 | 10.0 | 10.0 | 10.0 |
| ORGANIC SOLVENT | 1,2- PROPANEDIOL | 20.0 | 20.0 | 20.0 | 20.0 | 20.0 | 20.0 | 20.0 | 20.0 | 20.0 |
| | 1,3-PROPANEDIOL | — | — | — | — | — | — | — | — | — |
| | 1,2- BUTANEDIOL | — | — | — | — | — | — | — | — | — |
| | 2,3- BUTANEDIOL | — | — | — | — | — | — | — | — | — |
| | 1,2- HEXANEDIOL | 5.0 | 5.0 | 5.0 | 5.0 | 5.0 | 5.0 | 5.0 | 5.0 | 5.0 |
| | 2-METHYL-2,4-PENTANEDIOL | — | — | — | — | — | — | — | — | — |
| | DIPROPYLENE GLYCOL MONOBUTYL ETHER | 5.0 | 5.0 | 5.0 | 5.0 | 5.0 | 5.0 | 5.0 | 5.0 | 5.0 |
| | 3-METOXY-3-METHYL-1-BUTANOL | — | — | — | — | — | — | — | — | — |
| | 3-METOXY-N,N-DIMETHYL PROPIONAMIDE | — | — | — | — | — | — | — | — | — |
| ADDITIVE | BYK AQUACER 515 | — | — | — | — | — | — | — | — | — |
| | BYK348 | 0.5 | 0.5 | 0.5 | 0.5 | 0.5 | 0.5 | 0.5 | 0.5 | 0.5 |
| | TRIISOPROPANOLAMINE | 0.1 | 0.1 | 0.1 | 0.1 | 0.1 | 0.1 | 0.1 | 0.1 | 0.1 |
| | PROXEL XL2 | 0.1 | 0.1 | 0.1 | 0.1 | 0.1 | 0.1 | 0.1 | 0.1 | 0.1 |
| WATER | ULTRAPURE WATER | BALANCE | BALANCE | BALANCE | BALANCE | BALANCE | BALANCE | BALANCE | BALANCE | BALANCE |
| TOTAL (PERCENT BY MASS) | | 100 | 100 | 100 | 100 | 100 | 100 | 100 | 100 | 100 |

| | | COMPOSITION No. | | | | | | | |
|---|---|---|---|---|---|---|---|---|---|
| | | W10 | W11 | W12 | W13 | W14 | W15 | W16 | W17 |
| COLORANT | WHITE PIGMENT DISPERSION | 15.0 | 15.0 | 15.0 | 15.0 | 15.0 | 15.0 | 15.0 | 15.0 |
| | P.B. 15:3 | — | — | — | — | — | — | — | — |
| FIXING RESIN | FIXING RESIN DISPERSION | R10 | R11 | R12 | R13 | R14 | R15 | R16 | R17 |
| | BLENDING AMOUNT (SOLID CONTENT) | 10.0 | 10.0 | 10.0 | 10.0 | 10.0 | 10.0 | 10.0 | 10.0 |
| ORGANIC SOLVENT | 1,2- PROPANEDIOL | 20.0 | 20.0 | 20.0 | 20.0 | 20.0 | 20.0 | 20.0 | 20.0 |
| | 1,3-PROPANEDIOL | — | — | — | — | — | — | — | — |
| | 1,2- BUTANEDIOL | — | — | — | — | — | — | — | — |
| | 2,3- BUTANEDIOL | — | — | — | — | — | — | — | — |
| | 1,2- HEXANEDIOL | 5.0 | 5.0 | 5.0 | 5.0 | 5.0 | 5.0 | 5.0 | 5.0 |
| | 2-METHYL-2,4-PENTANEDIOL | — | — | — | — | — | — | — | — |
| | DIPROPYLENE GLYCOL MONOBUTYL ETHER | 5.0 | 5.0 | 5.0 | 5.0 | 5.0 | 5.0 | 5.0 | 5.0 |
| | 3-METOXY-3-METHYL-1-BUTANOL | — | — | — | — | — | — | — | — |
| | 3-METOXY-N,N-DIMETHYL PROPIONAMIDE | — | — | — | — | — | — | — | — |
| ADDITIVE | BYK AQUACER 515 | — | — | — | — | — | — | — | — |
| | BYK348 | 0.5 | 0.5 | 0.5 | 0.5 | 0.5 | 0.5 | 0.5 | 0.5 |
| | TRIISOPROPANOLAMINE | 0.1 | 0.1 | 0.1 | 0.1 | 0.1 | 0.1 | 0.1 | 0.1 |
| | PROXEL XL2 | 0.1 | 0.1 | 0.1 | 0.1 | 0.1 | 0.1 | 0.1 | 0.1 |
| WATER | ULTRAPURE WATER | BALANCE | BALANCE | BALANCE | BALANCE | BALANCE | BALANCE | BALANCE | BALANCE |
| TOTAL (PERCENT BY MASS) | | 100 | 100 | 100 | 100 | 100 | 100 | 100 | 100 |

TABLE 5

| | | COMPOSITION No. | | | | | | | | |
|---|---|---|---|---|---|---|---|---|---|---|
| | | W18 | W19 | W20 | W21 | W22 | W23 | W24 | W25 | W26 |
| COLORANT | WHITE PIGMENT DISPERSION | 15.0 | 15.0 | 15.0 | 15.0 | 15.0 | 15.0 | 15.0 | 15.0 | 15.0 |
| | P.B. 15:3 | — | — | — | — | — | — | — | — | — |
| FIXING RESIN | FIXING RESIN DISPERSION | R18 | R19 | R20 | R21 | R22 | R23 | R24 | R25 | R26 |
| | BLENDING AMOUNT (SOLID CONTENT) | 10.0 | 10.0 | 10.0 | 10.0 | 10.0 | 10.0 | 10.0 | 10.0 | 10.0 |
| ORGANIC SOLVENT | 1,2-PROPANEDIOL | 20.0 | 20.0 | 20.0 | 20.0 | 20.0 | 20.0 | 20.0 | 20.0 | 20.0 |
| | 1,3-PROPANEDIOL | — | — | — | — | — | — | — | — | — |
| | 1,2-BUTANEDIOL | — | — | — | — | — | — | — | — | — |
| | 2,3-BUTANEDIOL | — | — | — | — | — | — | — | — | — |
| | 1,2-HEXANEDIOL | 5.0 | 5.0 | 5.0 | 5.0 | 5.0 | 5.0 | 5.0 | 5.0 | 5.0 |
| | 2-METHYL-2,4-PENTANEDIOL | — | — | — | — | — | — | — | — | — |
| | DIPROPYLENE GLYCOL MONOBUTYL ETHER | 5.0 | 5.0 | 5.0 | 5.0 | 5.0 | 5.0 | 5.0 | 5.0 | 5.0 |
| | 3-METOXY-3-METHYL-1-BUTANOL | — | — | — | — | — | — | — | — | — |
| | 3-METOXY-N,N-DIMETHYL PROPIONAMIDE | — | — | — | — | — | — | — | — | — |
| ADDITIVE | BYK AQUACER 515 | — | — | — | — | — | — | — | — | — |
| | BYK348 | 0.5 | 0.5 | 0.5 | 0.5 | 0.5 | 0.5 | 0.5 | 0.5 | 0.5 |
| | TRIISOPROPANOLAMINE | 0.1 | 0.1 | 0.1 | 0.1 | 0.1 | 0.1 | 0.1 | 0.1 | 0.1 |
| | PROXEL XL2 | 0.1 | 0.1 | 0.1 | 0.1 | 0.1 | 0.1 | 0.1 | 0.1 | 0.1 |
| WATER | ULTRAPURE WATER | BALANCE | BALANCE | BALANCE | BALANCE | BALANCE | BALANCE | BALANCE | BALANCE | BALANCE |
| | TOTAL (PERCENT BY MASS) | 100 | 100 | 100 | 100 | 100 | 100 | 100 | 100 | 100 |

| | | COMPOSITION No. | | | | | | | |
|---|---|---|---|---|---|---|---|---|---|
| | | W27 | W28 | W29 | W30 | W31 | W32 | W33 | W34 |
| COLORANT | WHITE PIGMENT DISPERSION | 15.0 | 15.0 | 15.0 | 15.0 | 15.0 | 15.0 | 15.0 | 15.0 |
| | P.B. 15:3 | — | — | — | — | — | — | — | — |
| FIXING RESIN | FIXING RESIN DISPERSION | R27 | R28 | R29 | R30 | R31 | R32 | R33 | R34 |
| | BLENDING AMOUNT (SOLID CONTENT) | 10.0 | 10.0 | 10.0 | 10.0 | 10.0 | 10.0 | 10.0 | 10.0 |
| ORGANIC SOLVENT | 1,2-PROPANEDIOL | 20.0 | 20.0 | 20.0 | 20.0 | 20.0 | 20.0 | 20.0 | 20.0 |
| | 1,3-PROPANEDIOL | — | — | — | — | — | — | — | — |
| | 1,2-BUTANEDIOL | — | — | — | — | — | — | — | — |
| | 2,3-BUTANEDIOL | — | — | — | — | — | — | — | — |
| | 1,2-HEXANEDIOL | 5.0 | 5.0 | 5.0 | 5.0 | 5.0 | 5.0 | 5.0 | 5.0 |
| | 2-METHYL-2,4-PENTANEDIOL | — | — | — | — | — | — | — | — |
| | DIPROPYLENE GLYCOL MONOBUTYL ETHER | 5.0 | 5.0 | 5.0 | 5.0 | 5.0 | 5.0 | 5.0 | 5.0 |
| | 3-METOXY-3-METHYL-1-BUTANOL | — | — | — | — | — | — | — | — |

TABLE 5-continued

|  |  | | | | | | | | |
|---|---|---|---|---|---|---|---|---|---|
| ADDITIVE | 3-METOXY-N,N-DIMETHYL PROPIONAMIDE | — | — | — | — | — | — | — | — |
|  | BYK AQUACER 515 | — | — | — | — | — | — | — | — |
|  | BYK348 | 0.5 | 0.5 | 0.5 | 0.5 | 0.5 | 0.5 | 0.5 | 0.5 |
|  | TRIISOPROPANOLAMINE | 0.1 | 0.1 | 0.1 | 0.1 | 0.1 | 0.1 | 0.1 | 0.1 |
|  | PROXEL XL2 | 0.1 | 0.1 | 0.1 | 0.1 | 0.1 | 0.1 | 0.1 | 0.1 |
| WATER | ULTRAPURE WATER | BALANCE | BALANCE | BALANCE | BALANCE | BALANCE | BALANCE | BALANCE | BALANCE |
|  | TOTAL (PERCENT BY MASS) | 100 | 100 | 100 | 100 | 100 | 100 | 100 | 100 |

TABLE 6

|  |  | COMPOSITION No. | | | | | | | | |
|---|---|---|---|---|---|---|---|---|---|---|
|  |  | W35 | W36 | W37 | W38 | W39 | W40 | W41 | W42 | W43 |
| COLORANT | WHITE PIGMENT DISPERSION | 15.0 | 15.0 | 15.0 | 15.0 | 15.0 | 15.0 | 15.0 | 15.0 | 15.0 |
|  | P.B. 15:3 | — | — | — | — | — | — | — | — | — |
| FIXING RESIN | FIXING RESIN DISPERSION | R1 | R1 | R1 | R1 | R1 | R1 | R1 | R1 | R1 |
|  | BLENDING AMOUNT (SOLID CONTENT) | 10.0 | 5.0 | 15.0 | 10.0 | 10.0 | 10.0 | 10.0 | 10.0 | 10.0 |
| ORGANIC SOLVENT | 1,2- PROPANEDIOL | 20.0 | 20.0 | 20.0 | 10.0 | 30.0 | 20.0 | — | — | — |
|  | 1,3- PROPANEDIOL | — | — | — | — | — | — | — | 20.0 | — |
|  | 1,2- BUTANEDIOL | — | — | — | — | — | — | — | — | 20.0 |
|  | 2,3- BUTANEDIOL | — | — | — | — | — | — | 20.0 | — | — |
|  | 1,2- HEXANEDIOL | 5.0 | 5.0 | 5.0 | 5.0 | 5.0 | — | 5.0 | 5.0 | 5.0 |
|  | 2-METHYL-2,4-PENTANEDIOL | — | — | — | — | — | — | — | — | — |
|  | DIPROPYLENE GLYCOL MONOBUTYL ETHER | 5.0 | 5.0 | 5.0 | 5.0 | 5.0 | 5.0 | 5.0 | 5.0 | 5.0 |
|  | 3-METOXY-3-METHYL-1-BUTANOL | — | — | — | — | — | — | — | — | — |
|  | 3-METOXY-N,N-DIMETHYL PROPIONAMIDE | — | — | — | — | — | — | — | — | — |
| ADDITIVE | BYK AQUACER 515 | 1.0 | — | — | — | — | — | — | — | — |
|  | BYK348 | 0.5 | 0.5 | 0.5 | 0.5 | 0.5 | 1.0 | 0.5 | 0.5 | 0.5 |
|  | TRIISOPROPANOLAMINE | 0.1 | 0.1 | 0.1 | 0.1 | 0.1 | 0.1 | 0.1 | 0.1 | 0.1 |
|  | PROXEL XL2 | 0.1 | 0.1 | 0.1 | 0.1 | 0.1 | 0.1 | 0.1 | 0.1 | 0.1 |
| WATER | ULTRAPURE WATER | BALANCE | BALANCE | BALANCE | BALANCE | BALANCE | BALANCE | BALANCE | BALANCE | BALANCE |
|  | TOTAL (PERCENT BY MASS) | 100 | 100 | 100 | 100 | 100 | 100 | 100 | 100 | 100 |

|  |  | COMPOSITION No. | | | | | | |
|---|---|---|---|---|---|---|---|---|
|  |  | W44 | W45 | W46 | W47 | W48 | C1 | C2 |
| COLORANT | WHITE PIGMENT DISPERSION | 15.0 | 15.0 | 15.0 | 15.0 | 15.0 | — | — |
|  | P.B. 15:3 | — | — | — | — | — | 4.0 | 4.0 |
| FIXING RESIN | FIXING RESIN DISPERSION | R1 | R1 | R1 | R1 | R35 | R26 | R27 |
|  | BLENDING AMOUNT (SOLID CONTENT) | 10.0 | 10.0 | 10.0 | 10.0 | 10.0 | 10.0 | 10.0 |
| ORGANIC SOLVENT | 1,2- PROPANEDIOL | — | — | 20.0 | — | 20.0 | 20.0 | 20.0 |
|  | 1,3- PROPANEDIOL | — | — | — | — | — | — | — |
|  | 1,2- BUTANEDIOL | — | — | — | — | — | — | — |
|  | 2,3- BUTANEDIOL | — | — | — | — | — | — | — |
|  | 1,2- HEXANEDIOL | 5.0 | 5.0 | 5.0 | 5.0 | 5.0 | 5.0 | 5.0 |
|  | 2-METHYL-2,4-PENTANEDIOL | 20.0 | — | — | — | — | — | — |
|  | DIPROPYLENE GLYCOL MONOBUTYL ETHER | 5.0 | 5.0 | — | — | 5.0 | 5.0 | 5.0 |
|  | 3-METOXY-3-METHYL-1-BUTANOL | — | 20.0 | — | 20.0 | — | — | — |

TABLE 6-continued

| | | | | | | | | |
|---|---|---|---|---|---|---|---|---|
| | 3-METOXY-N,N-DIMETHYL PROPIONAMIDE | — | — | 5.0 | 5.0 | — | — | — |
| ADDITIVE | BYK AQUACER 515 | — | — | — | — | — | — | — |
| | BYK348 | 0.5 | 0.5 | 0.5 | 0.5 | 0.5 | 0.5 | 0.5 |
| | TRIISOPROPANOL-AMINE | 0.1 | 0.1 | 0.1 | 0.1 | 0.1 | 0.1 | 0.1 |
| | PROXEL XL2 | 0.1 | 0.1 | 0.1 | 0.1 | 0.1 | 0.1 | 0.1 |
| WATER | ULTRAPURE WATER | BALANCE | BALANCE | BALANCE | BALANCE | BALANCE | BALANCE | BALANCE |
| | TOTAL (PERCENT BY MASS) | 100 | 100 | 100 | 100 | 100 | 100 | 100 |

The components other than the components represented by the compound names shown in Tables 4 to 6 are as follows.

White pigment dispersion: metal oxide dispersion liquid C.I. Pigment White 6 (metal oxide content: 20 percent by mass, anionic dispersive resin content: 2 percent by mass)

The content in the table is shown by a solid content concentration.

P.B. 15: 3: Organic pigment dispersion liquid C.I. Pigment Blue 15: 3 (pigment content: 15 percent by mass, anionic dispersive resin content: 3.75 percent by mass)

The content in the table is shown by a solid content concentration.

Fixing resin dispersion: the resin dispersions shown in Tables 1 to 3.

The content in the table is shown by a solid content concentration.

BYK AQUACER 515: wax (manufactured by BYK Japan KK)

BYK-348: silicone-based surface tension adjuster (manufactured by BYK Japan KK)

Proxel XL2: fungicide/antiseptic agent (manufactured by Lonza Japan Ltd.)

4.3. Evaluation Method 4.3.1. Recording Test

A line printer was prepared by modification of L-4355A (ink jet printer) manufactured by Seiko Epson Corporation. In Examples described in Tables 7 to 9, by using the compositions shown in the same tables, recording was performed as described below.

A mechanism to perform one pass printing was configured such that the positions of recording heads were fixed in recording, and a recording medium was continuously transported. In the recording, a platen heater was operated, so that a surface temperature (maximum temperature in the recording) of the recording medium at a recording side facing the recording heads was set to 45° C. The recording heads are disposed in a stagger manner in a width direction of the recording medium to form a line head. By a secondary drying mechanism located downstream than the recording heads, the recording medium was dried at 80° C. (maximum temperature). One recording head (nozzle line) had 360 nozzles, and a nozzle density was set to 360 dpi. A recording pattern was a 20 cm×20 cm rectangular pattern, and an adhesion amount of the composition was set as shown in Tables 7 to 9.

The following recording media were used.

OPP: PYLEN P2102, polypropylene film, manufactured by Toyobo Co., Ltd.

PET: ESPET E5100, manufactured by Toyobo Co., Ltd.

Nylon: HARDEN N1100, manufactured by Toyobo Co., Ltd.

4.3.2. Evaluation of Adhesion

A cross-cut peeling test was performed on a solid portion of a printed image using a cloth adhesive tape (123LW-50, manufactured by Nichiban Co., Ltd.), and evaluation was performed in accordance with the following criteria.

A: No peeling is observed in 100 squares.
B: 1 to 10 squares out of 100 squares are peeled away.
C: 11 to 30 squares out of 100 squares are peeled away.
D: 31 squares or more out of 100 squares are peeled away.

4.3.3. Evaluation of Laminate Strength

After a dry laminate adhesive (main component TM-329/curing agent CAT-8B, manufactured by Toyo-Morton) was applied on a solid image portion on an OPP film by a bar coater, a casted polypropylene (CPP) film (trade name, PYLEN P1128, manufactured by Toyobo Co., Ltd.) was stuck thereon, and aging was performed at 40° C. for 48 hours. After the laminate thus formed was cut to have a width of 15 mm, the strength thereof was measured using a T-type peeling tester (test machine: Tensilon Universal Tester RTG-1250A, manufactured by A&D Company, Limited), and the "laminate strength" was evaluated in accordance with the following criteria. The results are shown in Tables 7 to 9.

A: Strength of 5N/15 mm or more is obtained.
B: Strength of 3N/15 mm to less than 5N/15 mm is obtained.
C: Strength of 1N/15 mm to less than 3N/15 mm is obtained.
D: Strength of less than 1N/15 mm is only obtained.

After a dry laminate adhesive (main component TM-569/curing agent CAT-10L, manufactured by Toyo-Morton) was applied on a solid image portion on a PET film by a bar coater, a polyethylene (LLDPE) film (trade name, LIX L6102, manufactured by Toyobo Co., Ltd.) was stuck thereon, and aging was performed at 40° C. for 48 hours. After the laminate thus formed was cut to have a width of 15 mm, the strength thereof was measured using a T-type peeling tester (test machine: Tensilon Universal Tester RTG-1250A, manufactured by A&D Company, Limited), and the "laminate strength" was evaluated in accordance with the following criteria. The results are shown in Tables 7 to 9.

A: Strength of 7N/15 mm or more is obtained.
B: Strength of 5N/15 mm to less than 7N/15 mm is obtained.
C: Strength of 3N/15 mm to less than 5N/15 mm is obtained.
D: Strength of less than 3N/15 mm is only obtained.

After a dry laminate adhesive (main component TM-569/curing agent CAT-10L, manufactured by Toyo-Morton) was applied on a solid image portion on a nylon film by a bar coater, a polyethylene (LLDPE) film (trade name, LIX L6102, manufactured by Toyobo Co., Ltd.) was stuck thereon, and aging was performed at 40° C. for 72 hours.

After the laminate thus formed was cut to have a width of 15 mm, the strength thereof was measured using a T-type peeling tester (test machine: Tensilon Universal Tester RTG-1250A, manufactured by A&D Company, Limited), and the "laminate strength" was evaluated in accordance with the following criteria. The results are shown in Tables 7 to 9.

A: Strength of 7N/15 mm or more is obtained.
B: Strength of 5N/15 mm to less than 7N/15 mm is obtained.
C: Strength of 3N/15 mm to less than 5N/15 mm is obtained.
D: Strength of less than 3N/15 mm is only obtained.

4.3.4. Evaluation of Blocking/Bleed-Through

By using an OPP film (PYLEN P2101, manufactured by Toyobo Co., Ltd.), a non-printing surface (non-corona treated surface) of a first film was overlapped on a solid image portion on a second film, and a load of 5 kgf/cm$^2$ was applied thereon using a blocking tester (CO-201 permanent strain tester, manufactured by Tester Sangyo Co., Ltd.) at 40° C. for 24 hours. When the first and the second films were peeled away from each other, the degree of image transfer was measured, and the "blocking property" was evaluated in accordance with the following criteria. The results are shown in Tables 7 to 9.

A: No image is transferred.
B: Although a slight tacky feeling remains, the image is not influenced.
C: the image is partially transferred.
D: 50% or more of the image is transferred.

By using a PET film (ESPET E5100, manufactured by Toyobo Co., Ltd.) and a nylon film (HARDEN N1100, manufactured by Toyobo Co., Ltd.), the evaluation was also performed in a manner similar to that described above.

TABLE 7

| | | | EXAMPLE No. | | | | | | | | | | | | | | | | | |
|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 |
| | | | COMPOSITION No. | | | | | | | | | | | | | | | | | | |
| | | | W1 | W2 | W3 | W4 | W5 | W6 | W7 | W8 | W9 | W10 | W11 | W12 | W13 | W14 | W15 | W16 | W17 | W18 | W19 |
| ADHESION AMOUNT OF COMPOSITION | | mg/inch$^2$ | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| EVALUATION RESULT | ADHESION | OPP FILM | C | C | B | C | C | C | A | B | A | A | A | B | B | C | C | C | B | B | C |
| | | PET FILM | A | B | A | A | A | B | B | C | A | A | A | C | B | B | A | A | B | B | A |
| | | NYLON FILM | A | B | A | A | A | B | A | B | A | A | A | B | A | A | A | A | A | A | A |
| | LAMINATE STRENGTH | OPP FILM | C | C | B | C | C | C | A | B | A | A | A | B | B | C | C | C | B | B | C |
| | | PET FILM | A | B | A | A | A | B | B | C | A | A | A | C | B | B | A | A | B | B | A |
| | | NYLON FILM | A | B | A | A | A | B | A | B | A | A | A | B | A | A | A | A | A | A | A |
| | BLOCKING/ BLEED-THROUGH | OPP FILM | A | A | A | B | B | A | A | A | A | B | B | A | A | A | A | A | A | A | A |
| | | PET FILM | B | B | B | C | C | A | B | B | B | C | C | A | B | B | B | B | B | B | B |
| | | NYLON FILM | B | B | B | C | C | A | B | B | B | C | C | A | B | B | B | B | B | B | B |

TABLE 8

| | | | EXAMPLE No. | | | | | | | | | |
|---|---|---|---|---|---|---|---|---|---|---|---|---|
| | | | 20 | 21 | 22 | 23 | 24 | 25 | 26 | 27 | 28 | 29 |
| | | | COMPOSITION No. | | | | | | | | | |
| | | | W20 | W21 | W22 | W35 | W36 | W37 | W38 | W39 | W40 | W41 |
| ADHESION AMOUNT OF COMPOSITION | | mg/inch$^2$ | 3.5 | 3.5 | 3.5 | 3.5 | 3.5 | 3.5 | 3.5 | 3.5 | 3.5 | 3.5 |
| EVALUATION RESULT | ADHESION | OPP FILM | B | C | C | B | C | A | B | B | B | B |
| | | PET FILM | B | A | A | A | B | A | A | A | A | A |
| | | NYLON FILM | A | A | A | A | B | A | A | A | A | A |

TABLE 8-continued

| | | | | | | | | | | | |
|---|---|---|---|---|---|---|---|---|---|---|---|
| LAMINATE STRENGTH | OPP FILM | B | C | C | C | C | A | B | B | B | B |
| | PET FILM | B | A | A | B | B | A | A | A | A | A |
| | NYLON FILM | A | A | A | B | B | A | A | A | A | A |
| BLOCKING/ BLEED-THROUGH | OPP FILM | A | A | A | A | A | A | A | B | A | A |
| | PET FILM | B | B | B | A | B | B | A | C | A | A |
| | NYLON FILM | B | B | B | A | B | B | A | C | A | A |

| | | | EXAMPLE No. | | | | | | | | |
|---|---|---|---|---|---|---|---|---|---|---|---|
| | | | 30 | 31 | 32 | 33 | 34 | 35 | 36 | 37 | 38 |
| | | | COMPOSITION No. | | | | | | | | |
| | | | W42 | W43 | W44 | W45 | W46 | W47 | W48 | W1 | W1 |
| ADHESION AMOUNT OF COMPOSITION | | mg/inch² | 3.5 | 3.5 | 3.5 | 3.5 | 3.5 | 3.5 | 3.5 | 0.1 | 6 |
| EVALUATION RESULT | ADHESION | OPP FILM | B | B | B | B | A | A | B | A | B |
| | | PET FILM | A | A | A | A | A | A | A | A | A |
| | | NYLON FILM | A | A | A | A | A | A | A | A | A |
| | LAMINATE STRENGTH | OPP FILM | B | B | B | B | A | A | B | A | B |
| | | PET FILM | A | A | A | A | A | A | A | A | A |
| | | NYLON FILM | A | A | A | A | A | A | A | A | A |
| | BLOCKING/ BLEED-THROUGH | OPP FILM | B | B | B | A | A | A | B | A | B |
| | | PET FILM | C | C | C | A | B | A | C | A | C |
| | | NYLON FILM | C | C | C | A | B | A | C | A | C |

TABLE 9

| | | | COMPARATIVE EXAMPLE No. | | | | | | | | | | | | REFERENCE EXAMPLE 1 | REFERENCE EXAMPLE 2 |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | | |
| | | | COMPOSITION No. | | | | | | | | | | | | | |
| | | | W23 | W24 | W25 | W26 | W27 | W28 | W29 | W30 | W31 | W32 | W33 | W34 | C1 | C2 |
| ADHESION AMOUNT OF COMPOSITION | | mg/inch² | 3.5 | 3.5 | 3.5 | 3.5 | 3.5 | 3.5 | 3.5 | 3.5 | 3.5 | 3.5 | 3.5 | 3.5 | 3.5 | 3.5 |
| EVALUATION RESULT | ADHESION | OPP FILM | C | A | D | D | D | A | D | A | D | A | D | A | C | C |
| | | PET FILM | A | B | C | D | A | D | A | D | A | D | A | D | C | A |
| | | NYLON FILM | A | A | C | C | A | A | A | A | A | A | A | A | C | A |
| | LAMINATE STRENGTH | OPP FILM | C | A | D | D | D | A | D | A | D | A | D | A | C | C |
| | | PET FILM | A | B | C | D | A | D | A | D | A | D | A | D | C | A |
| | | NYLON FILM | A | A | C | C | A | A | A | A | A | A | A | A | C | A |
| | BLOCKING/ BLEED-THROUGH | OPP FILM | C | C | A | A | C | C | A | C | C | A | A | C | A | C |
| | | PET FILM | D | D | A | A | D | D | B | B | D | D | B | B | A | D |
| | | NYLON FILM | D | D | A | A | D | D | B | B | D | D | B | B | A | D |

4.4. Evaluation Results

In each example in which the white ink composition including an acrylic-based resin which had an acid value of 50.0 to 100.0 mgKOH/g and a glass transition temperature of 20.0° C. to 50.0° C. was used, the laminate strength and the anti-blocking property were excellent.

On the other hand, in each comparative example in which the above conditions of each example were not satisfied, at least one of the laminate strength and the anti-blocking property was inferior.

In addition, although not shown in the tables, in Example 1, after the white ink was adhered, the non-white ink was adhered on a white ink layer thus formed as was the case of Reference Example 1, and evaluation was performed in a manner similar to that described above. As a result, it was found that the adhesion, the laminate strength, and the anti-blocking property were excellent.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions are obtained.

A white ink composition according to an aspect of the present disclosure is an aqueous ink jet ink which includes a white colorant and a fixing resin, and the fixing resin contains an acrylic-based resin having an acid value of 50.0 to 100.0 mgKOH/g and a glass transition temperature of 20.0° C. to 50.0° C.

According to the white ink composition described above, a recorded matter including a white image having preferable laminate strength and anti-blocking property may be formed. That is, since the white ink composition includes a fixing resin which contains an acrylic-based resin having an acid value in the range described above, the laminate strength is improved, and since the white ink composition includes a fixing resin which contains an acrylic-based resin having a glass transition temperature in the range described above, a recorded matter also having a preferable anti-blocking property may be formed.

In the white ink composition described above, the acrylic-based resin is in the form of particles, and a volume average particle diameter of the particles may be 100.0 to 150.0 nm.

According to this white ink composition, a recorded matter including a white image which has a more preferable balance between the laminate strength and the anti-blocking property may be formed.

In the white ink composition described above, a content of the acrylic-based resin with respect to the total mass of the composition may be 1.0 to 15.0 percent by mass.

According to this white ink composition, a recorded matter including a white image which has more preferable laminate strength and anti-blocking property may be formed.

In the white ink composition described above, the acrylic-based resin includes constituent units derived from a vinyl monomer, and a rate of the constituent units derived from a vinyl monomer to all constituent units of the acrylic-based resin may be 35.0 percent by mass or less.

According to this white ink composition, a recorded matter including a white image which has more preferable laminate strength and anti-blocking property may be formed.

In the white ink composition described above, the acrylic-based resin includes constituent units derived from an aromatic (meth)acrylate or an alicyclic (meth)acrylate, and a rate of the constituent units derived from an aromatic (meth)acrylate or an alicyclic (meth)acrylate to all the constituent units of the acrylic-based resin may be 40.0 percent by mass or less.

According to this white ink composition, a recorded matter including a white image which has more preferable laminate strength and anti-blocking property may be formed.

In the white ink composition described above, the acrylic-based resin includes constituent units derived from a long chain aliphatic (meth)acrylate, and a rate of the constituent units derived from a long chain aliphatic (meth)acrylate to all the constituent units of the acrylic-based resin may be 30.0 percent by mass or more.

According to this white ink composition, a recorded matter including a white image which has a more preferable laminate strength may be formed.

In the white ink composition described above, a content of the white colorant with respect to the total mass of the composition may be 5.0 to 20.0 percent by mass.

According to this white ink composition, a recorded matter including a white image which has more preferable color development property and background shielding property may be formed.

The white ink composition described above may further include: a nitrogen-containing solvent or a glycol ether solvent having 8 carbon atoms or less.

According to this white ink composition, a recorded matter including a white image which has a more preferable anti-blocking property may be formed.

In the white ink composition described above, a recorded matter obtained using the white ink composition may have a recorded surface to be processed by a laminate treatment.

According to this white ink composition, a recorded matter including a white image which has a preferable laminate strength may be formed.

The white ink composition described above may be used for recording on a low-absorbing recording medium or a non-absorbing recording medium.

According to this white ink composition, a recorded matter including a white image which has more preferable laminate strength and anti-blocking property may be formed using the low-absorbing recording medium or the non-absorbing recording medium.

A recording method includes a step of adhering one of the white ink compositions described above to a recording medium by an ink jet method.

According to this recording method, a recorded matter including a white image which has more preferable laminate strength and anti-blocking property may be formed.

What is claimed is:

1. A white ink composition which is an aqueous ink jet ink, comprising:
   a white colorant; and
   a fixing resin,
   wherein the fixing resin contains an acrylic-based resin having an acid value of 55.0 to 100.0 mgKOH/g and a glass transition temperature of 23.0° C. to 50.0° C.

2. The white ink composition according to claim 1, wherein the acrylic-based resin is in the form of particles, and
   a volume average particle diameter of the particles is 100.0 to 150.0 nm.

3. The white ink composition according to claim 1, wherein a content of the acrylic-based resin with respect to the total mass of the composition is 1.0 to 15.0 percent by mass.

4. The white ink composition according to claim 1, wherein the acrylic-based resin includes constituent units derived from a vinyl monomer, and
   a rate of the constituent units derived from a vinyl monomer to all constituent units of the acrylic-based resin is 35.0 percent by mass or less.

5. The white ink composition according to claim 1, wherein the acrylic-based resin includes constituent units derived from an aromatic (meth)acrylate or an alicyclic (meth)acrylate, and
   a rate of the constituent units derived from an aromatic (meth)acrylate or an alicyclic (meth)acrylate to all constituent units of the acrylic-based resin is 40.0 percent by mass or less.

6. The white ink composition according to claim 1, wherein the acrylic-based resin includes constituent units derived from a long chain aliphatic (meth)acrylate, and
   a rate of the constituent units derived from a long chain aliphatic (meth)acrylate to all constituent units of the acrylic-based resin is 30.0 percent by mass or more.

7. The white ink composition according to claim 1, wherein a content of the white colorant with respect to the total mass of the composition is 5.0 to 20.0 percent by mass.

8. The white ink composition according to claim 1, further comprising: a nitrogen-containing solvent or a glycol ether solvent having 8 carbon atoms or less.

9. The white ink composition according to claim 1, wherein the white ink composition is used to form a recorded matter having a recorded surface, and
   the recorded surface is processed by a laminate treatment.

10. The white ink composition according to claim 1, wherein the white ink composition is used for recording on a low-absorbing recording medium or a non-absorbing recording medium.

11. A recording method comprising:
    adhering the white ink composition according to claim 1 to a recording medium by an ink jet method.

* * * * *